United States Patent
Uddin et al.

(10) Patent No.: US 10,826,828 B2
(45) Date of Patent: Nov. 3, 2020

(54) SYSTEMS AND METHODS FOR ENCODING AND DECODING IOT MESSAGES

(71) Applicant: Nokia Technologies Oy, Espoo (FI)

(72) Inventors: Mostafa Uddin, Holmdel, NJ (US); Murali Kodialam, Marlboro, NJ (US); Fang Hao, Morganville, NJ (US); Sarit Mukherjee, Morganville, NJ (US)

(73) Assignee: NokiA Technologies Oy, Espoo (FI)

( * ) Notice: Subject to any disclaimer, the term of this patent is extended or adjusted under 35 U.S.C. 154(b) by 0 days.

(21) Appl. No.: 16/202,337

(22) Filed: Nov. 28, 2018

(65) Prior Publication Data

US 2020/0169504 A1 May 28, 2020

(51) Int. Cl.
*H04L 12/749* (2013.01)
*H04L 12/66* (2006.01)
*H04L 12/08* (2006.01)
*H04L 29/08* (2006.01)

(52) U.S. Cl.
CPC .......... *H04L 45/741* (2013.01); *H04L 12/66* (2013.01); *H04L 67/12* (2013.01)

(58) Field of Classification Search
CPC ........ H04L 45/741; H04L 67/12; H04L 12/66
See application file for complete search history.

(56) References Cited

U.S. PATENT DOCUMENTS

| 9,367,976 B2 | 6/2016 | Logan et al. |
| 2003/0156582 A1 | 8/2003 | Belgaied et al. |
| 2011/0149962 A1 * | 6/2011 | Ait-Ameur ............ H04L 45/50 370/392 |
| 2015/0019710 A1 | 1/2015 | Shaashua et al. |
| 2016/0112429 A1 | 4/2016 | Sundaresan et al. |
| 2017/0109512 A1 * | 4/2017 | Bower ................... G06F 21/32 |

FOREIGN PATENT DOCUMENTS

| CN | 105684391 | 6/2016 | |
| WO | WO-2015066369 A1 * | 5/2015 | ............ H04L 63/20 |

OTHER PUBLICATIONS

S. K. Fayazbakhsh, L. Chiang, V. Sekar, M. Yu, and J. C. Mogul, "Enforcing network-wide policies in the presence of dynamic middlebox actions using flowtags," in Proceedings of NSDI, 2014.
R. MacDavid, R. Birkner, O. Rottenstreich, A. Gupta, N. Feamster, and J. Rexford, "Concise encoding of flow attributes in sdn switches," in Proceedings of the Symposium on SDN Research, ser. SOSR '17. New York, NY, USA: ACM, 2017, pp. 48-60. [Online]. Available: http://doi.acm.org/10.1145/30502203050227.
P. Quinn, U. Elzur, and C. Pignataro, "Network Service Header (NSH)," Internet Requests for Comments, RFC 8300, Jan. 2018.
N. Kang, O. Rottenstreich, S. G. Rao, and J. Rexford, "Alpaca: Compact network policies with attribute-encoded addresses," IEEE/ACM Transactions on Networking, vol. 25(3), 2017.
Qixu Wang, Dajiang Chen, Ning Zhang, Zhen Qin, and Zhiguang Qin, "LACS: A Lightweight Label-Based Access Control Scheme in IoT-Based 5G Caching Context", Publication date Mar. 6, 2017, vol. 5, pp. 4018-4027.

* cited by examiner

*Primary Examiner* — Arvin Eskandarnia
*Assistant Examiner* — Chhian (Amy) Ling
(74) *Attorney, Agent, or Firm* — Capitol Patent & Trademark Law Firm, PLLC

(57) ABSTRACT

Internet-of-Things messages can be transported, encoded and decoded using inventive source and destination attribute labels.

17 Claims, 10 Drawing Sheets

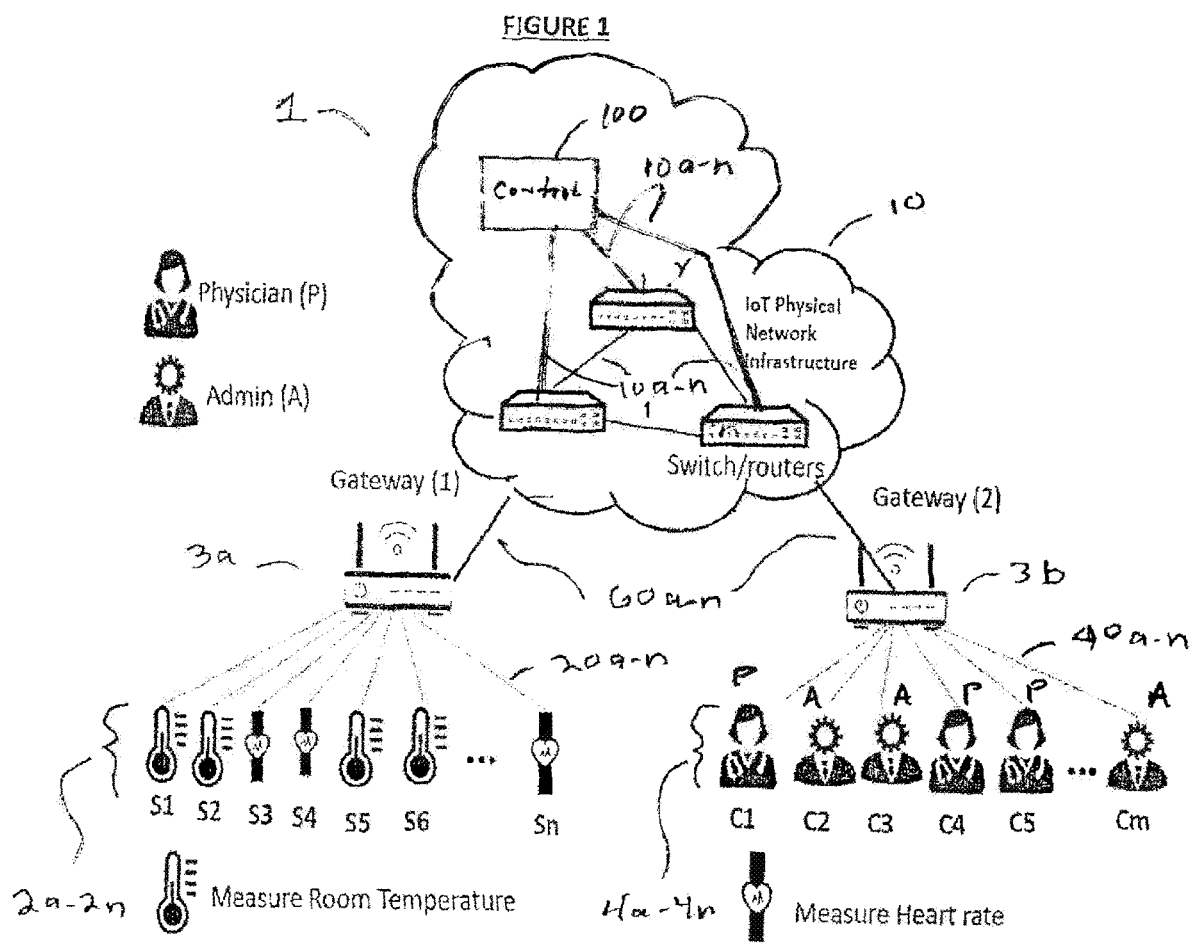

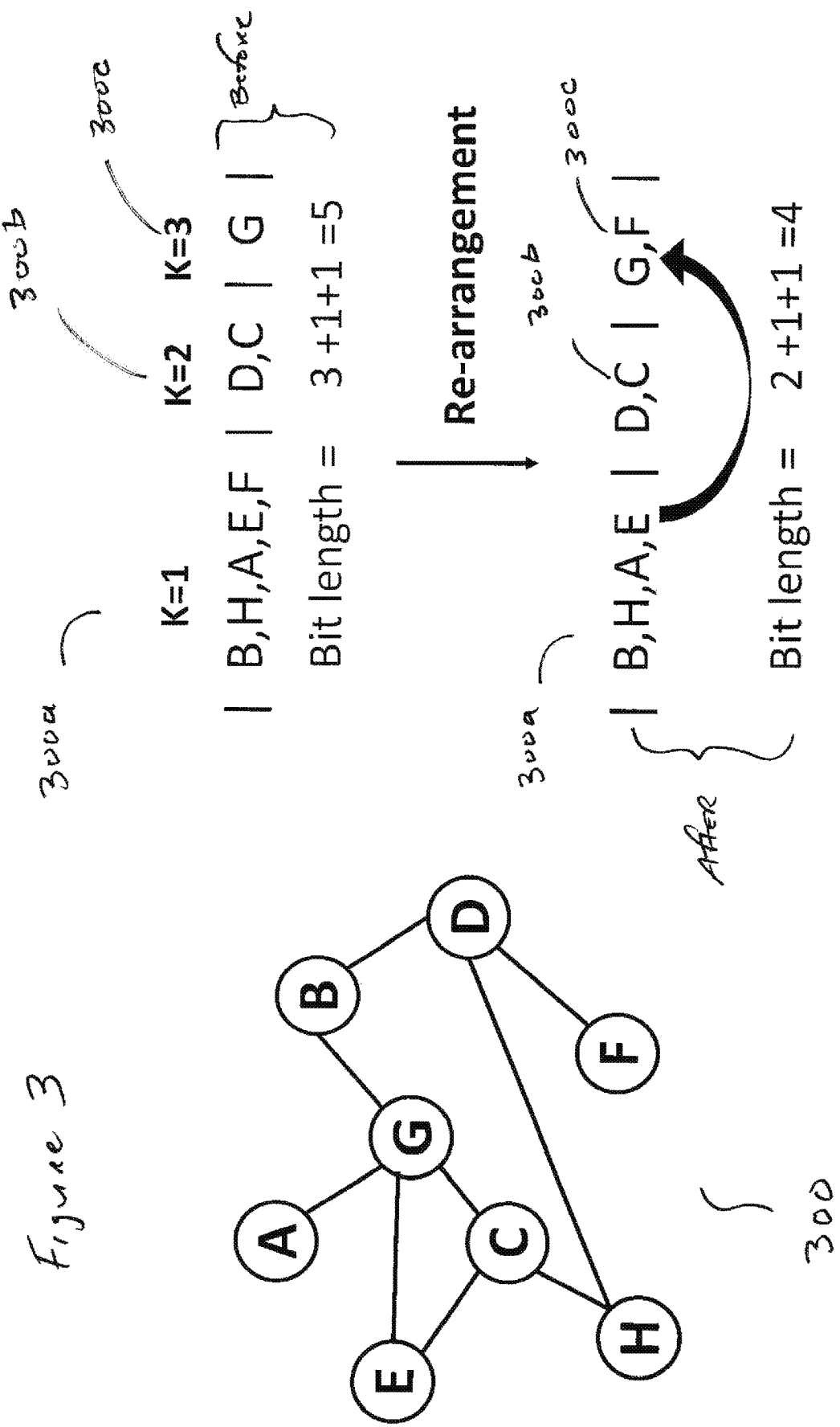

SYSTEMS AND METHODS FOR ENCODING AND DECODING IOT MESSAGES

INTRODUCTION

This section introduces aspects that may be helpful to facilitate a better understanding of the described invention(s). Accordingly, the statements in this section are to be read in this light and are not to be understood as admissions about what is, or what is not, in the prior art.

With the growing number of Internet-of-Things (IoT) compatible or capable devices (collectively "IoT compatible devices" or just "IoT devices"), it becomes critical to have a telecommunications network infrastructure that connects such IoT devices and is tailored to diverse requirements, traffic characteristics, and underlying protocol usage of such devices. Currently, IoT devices are connected to hardware servers in the telecommunication's "cloud" so that all communications among applications and IoT devices occur indirectly through the cloud. Using such a cloud-based architecture, so called information "access policies" can be controlled within the cloud. Although convenient, this cloud-based infrastructure may not always satisfy the diverse device and application requirements for privacy, security, reliability, QoS guarantees, etc. For example, medical devices in a hospital should be able to operate properly without having to primarily rely on network connectivity policies that reside in the cloud. Likewise, certain individuals may prefer to keep their private information at home, not exposed to the public cloud. In order to address such requirements, a more versatile network infrastructure that can support both remote, device-to-cloud and local, device-to-device communication patterns is desirable. In order to enable such a versatile network infrastructure, one main challenge is to support in-network policy enforcement and access control.

Generally speaking, in an IoT communications network devices operate in one of two roles: either as a "service" provider (e.g., a temperature sensor) that provides one or more services based on requests it receives, or as a client (e.g., a smart phone) that generates the requests, runs applications and receives information from service provider devices. Accordingly, a key factor in determining communication patterns in a given network are the many different types of services that may be provided.

However, different services may have different access control policies and network resource requirements. Implementing such policies requires installing rules (e.g., instructions stored as signals in electronic memory) in telecommunication hardware gateways, switches or routers in a given network infrastructure. Given the large number of devices that may be deployed in an IoT network, it becomes a challenge to accommodate all of the many policies required by installing and managing rules.

For example, consider a hospital scenario where IoT compatible heart-rate monitors and room temperature sensors are deployed as service provider devices to help monitor the status of patients and their surrounding environment. The heart-rate monitors provide a heart-rate "service" while the temperature sensors provide a temperature "service". Suppose further that different users can access these monitors and sensors using a mobile device. For example, assume that there are access control policies where a physician may access the heart-rate service but cannot access the temperature service, while the hospital's staff can only access the temperature service. Currently, Media Access Control ("MAC") or Internet Protocol ("IP") telecommunications addresses are used to identify specific users and devices.

However, in such a scenario order to practically implement access control policies for all of the many users and IoT compatible devices a large number of micro-flow rules are required to be created and stored in order to enumerate all of the many different user and device combinations.

Further, in order to provide services using IoT compatible devices, an underlying network infrastructure must support a large number of such devices that may use different underlying IoT protocols (e.g., Blue Tooth Low Energy, or "BLE" for short) and support diverse services (e.g., applications that require different privacy, reliability and QoS guarantees, etc). Many of these requirements may be satisfied by implementing an in-network packet forwarding policy that supports direct device-to-device communications. However, with such a large number of possible devices deployed in an IoT network, the number of rules required for policy enforcement is expected to grow very rapidly. Thus, it becomes a challenge to install and manage all of the necessary rules in switches/routers using existing device-to-device methodologies.

A network of IoT devices and services provides additional challenges that need to be addressed as well. For example, the uniqueness of the type and possible number of services in an IoT network has to be considered. Further, unlike IP based services, IoT services cannot be characterized by using existing, simple "single tag" methodologies.

Some have suggested using one or more existing addressing schemes. However, because (in general) an IoT device can provide an arbitrary set of services depending on its designed functionality, such existing addressing schemes are insufficient to satisfy all of the many possible service combinations.

Accordingly, it is desirable to provide systems, devices and related methods that accommodate a large number of IoT devices and services and their associated policy control and QoS requirements that can be applied as an IoT network grows (i.e., without compromising scalability).

SUMMARY

The inventors disclose various systems, devices and related methods that may be used to accommodate a large number of IoT devices and their associated policy control and QoS requirements without compromising scalability (i.e., are applicable to a large number of devices and services).

In particular, the inventors describe exemplary embodiments where inventive source and destination "attribute" labels are assigned to packets of an IoT message according to "services" (heart-rate, temperature, etc.) or "roles" (physician, admin, etc.) of the corresponding service provider devices and client devices. Thereafter, policies may be associated with mega-flow rules (e.g., physician, heart-rate→fwd), (physician, temperature→drop). When used herein the phrase "attribute" means either a service provided by, or a "role" of, an IoT compatible device or user.

The inventors believe that the ideas illustrated by the embodiments described herein significantly reduce the number of rules required to implement policies used to control IoT devices, which in turn leads to a reduction in the cost of the hardware devices and their maintenance because the fewer the number of rules the less electronic memory needed to store such rules in electronic switches, routers, gateways, etc. For example, let's assume there are 200 heart rate monitoring devices in a hospital that employs 40 physicians and 20 administrative people. Further, assume that the hospital has a policy that only allows the physicians, and not the administrative people, to access information from the heart-rate monitors (i.e., a "heart rate service"). If an existing technique is used (e.g., a MAC addressing technique) to implement such a policy hundreds of rules for each pair of devices may be required. In contrast, the inventors provide for inventive "labels" in place of existing bits of an address field that allows for the implementation of the same policy but using far fewer number of rules.

Yet further, the fewer the number of rules the faster such rules may be updated as changes are made to a network of IoT devices (e.g., as devices are added or subtracted).

Yet further, in the embodiments set forth herein the inventors describe systems, devices and related methods that generate optimum length "labels" (i.e., bit sequences) for encoding attributes of IoT devices (i.e., the labels represent attributes of IoT devices). Due to the non-convex nature of their optimizations, the inventors further describe two heuristic solutions for label generation. Finally, the inventors describe experiments that demonstrate the benefits of the inventive solutions—solutions that are believed to allow IoT messages to be exchanged between a large number of IoT devices using a reduced number of rules versus existing methodologies by several orders of magnitude.

That said, it should be understood that while the embodiments described herein may be expected to improve the performance of IoT messaging networks and reduce costs compared to existing, conventional approaches, no particular result is a requirement of the described and claimed invention(s) unless explicitly recited in a particular claim set forth in the numbered paragraphs at the end of this description.

In more detail, one embodiment is directed at a system (e.g., a hardware, telecommunications gateway) for encoding an IoT packet, where the system may be operable to: detect information related to an IoT source device and information related to an IoT destination device in the IoT packet, wherein the IoT source and destination devices are in an IoT network; generate a source attribute label based on the detected information of the IoT source device; and generate a destination attribute label based on the detected information of the IoT destination device.

The so generated source and destination attribute labels may each comprise one or more bit sequences derived from minimizing a number of groups of non-conflicting attributes that correspond to a plurality of IoT devices in an IoT network.

In one embodiment, the IoT source device comprises a client device and the IoT destination device comprises a service provider device, while in another embodiment the IoT source device comprises a service provider device and the IoT destination device comprises a client device.

Yet further, the generated source attribute label may comprise role attributes of the IoT source device and the generated destination attribute label may comprise service attributes of the IoT destination device, or, alternatively, the generated source attribute label may comprise service attributes of the IoT source device and the generated destination attribute label may comprise role attributes of the IoT destination device.

The exemplary system may be further operable to generate an encoded packet by inserting generated source and destination attribute labels into fields that correspond to source and destination address fields, for example, by inserting the source and destination attribute labels into predetermined positions in the address fields.

Alternatively, the exemplary system may be operable to insert source and destination attribute labels into randomly selected positions in address fields.

In another embodiment, the system may generate an encoded packet by inserting the generated source and destination attribute labels into fields that correspond to source and destination address fields of a core Internet Protocol (IP) (e.g., IPv4 or IPv6 fields).

In addition to the encoding embodiments just described, the present invention also provides for decoding embodiments. One such embodiment may comprise a system (e.g., hardware, telecommunications gateway) for decoding an encoded IoT packet, where the system may be operable to: receive the encoded IoT packet, and detect a source attribute label within a source address field of the IoT packet and a destination attribute label within a destination address field of the IoT packet, wherein the source and destination attribute labels each comprise one or more bit sequences derived from minimizing a number of groups of non-conflicting attributes that correspond to a plurality of IoT devices in the IoT network.

The system may be further operable to compare the source attribute label to a plurality of stored, reference bit sequences to determine attributes that correspond to an IoT source device, and compare the destination attribute label to the plurality of stored, reference bit sequences to determine attributes that correspond to an IoT destination device.

Yet further, the system may be operable to generate a decoded packet that comprises the determined attributes of the IoT source and destination devices.

In addition to the encoding and decoding systems the present invention also provides: (a) IoT devices that may be operable to receive a decoded IoT message comprising source and destination attributes, the attributes derived from decoded source and destination attribute labels that are based on minimizing a number of groups of non-conflicting attributes that correspond to a plurality of IoT devices, including the IoT device, in an IoT network; (b) devices for transporting IoT messages (e.g., hardware telecommunications switches, routers), each device operable to receive an encoded packet, the encoded packet comprising encoded source and destination attribute labels that are based on minimizing a number of groups of non-conflicting attributes that correspond to a plurality of IoT devices, in an IoT network, compare the encoded attribute labels to one or more stored digital masks to determine if the attribute labels correspond to one or more stored rules, and complete one or more actions or functions that correspond to the rules if the comparison indicates that the attribute labels correspond to one or more stored rules; and (c) systems (e.g., central controllers, hardware network management systems) for generating referential bit sequences for a network of IoT devices, where the system may be operable to generate the referential bit sequences based on minimizing a number of groups of non-conflicting attributes that correspond to a plurality of IoT devices, in an IoT network, store the generated bit sequences, and distribute or forward the so generated sequences to one or more additional devices responsible for transporting IoT messages.

DESCRIPTION OF THE DRAWINGS

FIG. 1 depicts a simplified network that contains one or more systems and devices according to various embodiments.

FIG. 3 illustrates a re-arrangement step that may be used as part of an exemplary, inventive methodology according to an embodiment of the invention.

DETAILED DESCRIPTION

Figure 2A:
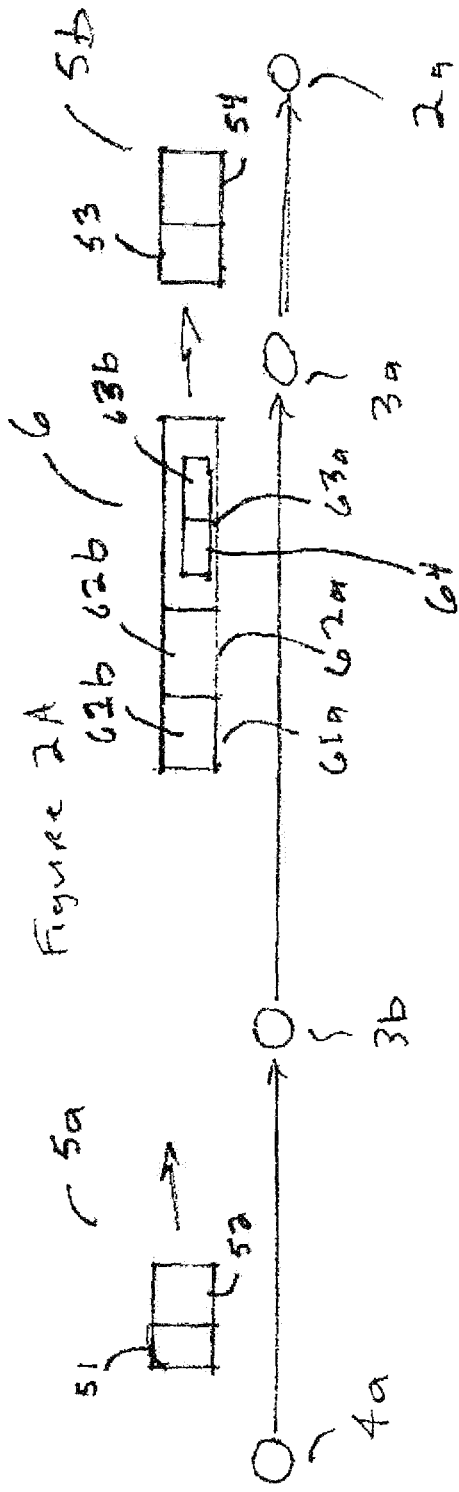
FIG. 2A depicts a simplified exemplary "request" message according an embodiment of the invention.

Exemplary embodiments of systems, devices and related methods for encoding and decoding IoT messages are described herein and are shown by way of example in the drawings. Throughout the following description and drawings, like reference numbers/characters refer to like elements.

It should be understood that, although specific embodiments are discussed herein, the scope of the disclosure is not limited to such embodiments. To the contrary, it should be understood that the embodiments discussed herein are for illustrative purposes, and that modified and alternative embodiments that otherwise fall within the scope of the disclosure are contemplated.

It should also be noted that one or more exemplary embodiments may be described as a process or method (the words "method" or "methodology" may be used interchangeably with the word "process" herein). Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method if, for example, such steps are known by those skilled in the art.

As used herein, the term "and/or" includes any and all combinations of one or more of the associated listed items. As used herein, the singular forms "a," "an" and "the" are intended to include the plural form, unless the context and/or common sense indicates otherwise.

It should be understood that when a system or device or a component or element of a system or device is referred to, or shown in a figure, as being "connected" to (or other tenses of connected) another system, device (or component or element of a system or device) such systems, devices, components or elements may be directly connected, or may use intervening components or elements to aid a connection. In the latter case, if the intervening systems, devices, components or elements are well known to those in the art they may not be described herein or shown in the accompanying figures.

When the words "first", "second", "third" or other similar words denoting a number are used it should be understood that the use of these words does not denote a level of importance or priority. Rather, such words are used to merely distinguish one part, section, component, element or step of an inventive system, device or method from another.

As used herein the terms "operable to", "configured to" or "adapted to" mean "functions to" unless the context indicates otherwise.

As used herein it should be understood that the phrases "system" and "device" (e.g., central controller, gateways, switches, routers, mobile devices, tablets, laptop computers, personal computers (PCs)) may include one or more electronic processors and other electronic/electrical circuitry that are operable to retrieve and execute instructions stored as electronic signals in electronic memory, where a set of such stored instructions may constitute steps in an inventive process or application, or used to complete an inventive function such as encoding, decoding, inserting, randomly selecting, distributing, forwarding, receiving, transmitting, completing, generating, comparing, minimizing and storing to name just a few inventive functions that may be completed by executing stored electronic instructions. Further, it should be understood that each of the embodiments of systems and devices described herein are configured with the necessary hardware components to enable each system or device to process information and messages much faster than humanly possible and to exchange information and messages much faster than humanly possible. Each of the embodiments of the present invention cannot practically be implemented in any amount of time that would be acceptable to one skilled in the art using human beings as substitutes for the systems and devices described herein. For example, the embodiments described herein involve an exchange of messages between IoT compatible devices, where the messages contain encoded request signals and data that must be substantially, immediately processed in order to generate one or more responsive signals and corresponding messages and to complete one or more functions or actions (e.g., rules). Accordingly, the speeds at which the messages are encoded (decoded) and exchanged, and the amount of messages and data exchanged is many times faster than can be communicated and processed by the human mind within the time periods demanded by users of embodiments of the present invention and those skilled in the art of the present invention.

As used herein, the term "embodiment" or "exemplary" mean an example that falls within the scope of the invention(s).

As used herein the phrases "altered" or "altered field" means an address field that includes bits other than those that indicate an address.

Embodiments described herein are derived from the discovery by the inventors that attributes of IoT devices (i.e., the services provided by IoT devices and the roles of the users of such devices) can be used to transport messages between such devices in a manner that is substantially more efficient than existing methodologies.

In embodiments of the invention described in more detail herein, inventive systems are operable to encode IoT messages with inventive "labels" to transport messages between IoT devices. Further, inventive systems are described that are operable to generate the labels based on stored, reference values (e.g., bit sequences) that correspond to attributes (i.e., services provided, roles) of IoT devices and users. In an embodiment, the attributes corresponding to an encoded label are associated with stored policy rules. Yet further, to ensure that each packet making up a message can carry multiple attributes in a label without conflicting with another attribute, in an embodiment an inventive system is operable to generate packets where conflicting attributes are positioned within different label "partitions" (i.e., groups, groupings).

As explained further herein, the inventors formulated an inventive labelling methodology as an optimization problem that sought to minimize the bit length of a bit sequence that corresponds to a label using so-called "attribute conflict graphs". In general, conflict graphs are known by those skilled in the art. However, the inventors discovered that the problem to be solved was non-convex, and, therefore, the inventors further discovered and developed two heuristic labelling processes to solve such a problem. The inventors completed experimental simulations (i.e., experiments) described elsewhere herein to illustrate that both inventive processes create labels (bit sequences) that include far fewer bits than existing approaches. Furthermore, the inventive labelling methodologies reduce the number of rules need to implement access control policies while enabling multi-service policy control.

Before presenting some exemplary embodiments, we first provide an explanation of a few additional terms that we will use throughout this disclosure.

Typically, communications between IoT devices involve a "request-response" pair of messages or sequence of messages. In a communication (sometimes referred as a "transaction" in IoT terminology), the IoT device that sends a request (e.g., Read, Write, etc.) is considered a "client device" (or "client" for short). The device that responds (with a requested service or an "acknowledgement") is considered a "server" or "service provider device". To avoid unnecessary confusion with the use of the term "server" that may also be used in telecommunications to describe a different device, we shall use the phrase "service provider device" or simply "service provider" herein. That said, it should be understood that the same physical device may sometimes function as a "client" and other times as a "service provider" (i.e., the system or device is capable of functioning as one or both). However, for a given transaction or a single "request-response" exchange of messages, the same physical device (or port of a device) functions either as a client or a service provider, but not both. In embodiments of the invention, both the client and service provider in a given transaction have attributes (e.g., services, roles) associated with them.

Referring now to FIG. 1 there is depicted a simplified network 1 that contains one or more systems and devices according to various embodiments of the invention. In an embodiment, the exemplary network 1 may comprise an IoT network for a hospital, for example.

The network 1 may comprise one or more central controllers 100a-n (where "n" is the last controller), hardware switches and/or routers 1a,1b, . . . 1n (where "n" is the last switch or router), a first set of one or more IoT devices 2a, 2b, . . . 2n (where "n" is the last device), a second set of IoT devices 4a, 4b, . . . 4n (where, again, "n" is the last device) and gateways 3a,3b, . . . 3n (where "n" is the last gateway).

In the embodiment depicted in FIG. 1, a single central controller 100 is shown for the sake of simplicity, though it should be understood that more than one central controller may be used. The central controller 100, hardware switches and routers 1a, 1b, . . . 1n may be connected via pathways 10a-n (where "n" is the last pathway) and may be part of, or connected to, a core IP network. In an embodiment, the one or more hardware switches or routers 1a, 1b, . . . 1n may also be connected to one or more of the gateways 3a,3b, . . . 3n via pathways or connections 60a-n while each gateway 3a,3b, . . . 3n may, in turn, be connected to a set of one or more IoT devices. In the example depicted in FIG. 1, the gateway 3a may be connected to the first set of IoT devices 2a, 2b, . . . 2n and the gateway 3b may be connected to the second set of IoT devices 4a, 4b, . . . 4n via pathways or connections 20a-n. In embodiments of the invention each set of IoT devices 2a,2b, . . . 2n and 4a,4b, . . . 4n may be operable to communicate with a respective gateway, 3a, 3b using one or more IoT protocols, such as BLE, for example, while the gateways 3a, 3b are operable to communicate with each other and the switches/routers 1a, 1b, . . . 1n and central controller 100 using a core IP packet protocol, (e.g., IPv4, IPv6) for example.

Recognizing that each of the IoT devices 2a, 2b, . . . 2n and 4a, 4b, . . . 4n may function as a client or a service provider depending on a given transaction, for purposes of simplifying the following discussion we will assume that the first set of IoT devices 2a, 2b, . . . 2n are service providers and the second set of IoT devices 4a, 4b, . . . 4n are clients. Some specific examples of clients may be mobile communication devices (mobile phones, laptops, tablets, etc.) and PCs, while some examples of service providers may be sensors and monitors, such as temperature and heart rate sensors. In an embodiment, each client device 4a, 4b, . . . 4n may be associated with a plurality of roles. In our exemplary hospital scenario the roles may be Physician (P) or Administration (A). Further, each temperature sensor among sensors 2a,2b, . . . 2n may be operable to measure the temperature in a hospital room and provide data that corresponds to the measured temperatures to the gateway 3a, while each of the heart-rate sensors among sensors 2a,2b, . . . 2n may be operable to measure a patient's heart rate and provide data that corresponds to the measured heart rates to the gateway 3a. In this example, we will consider both types of services provided by each type of sensor 2a, 2b . . . to 2n as being combined into a single service. We will also assume (for purposes of explaining an embodiment of the invention) that the hospital has determined that only those individuals categorized as "Administration" (A) may access the temperature data (and, therefore, the service provided by the temperature sensors), and only those individuals categorized as "Physicians" (P) may access the heart-rate data (and, therefore, the service provided by the heart-rate sensors). Currently, existing methodologies attempt to assign a specific identification (ID) to each connected IoT device at a gateway. This ID can be based on the device's MAC or IP address. Therefore, currently, to implement access control policies one rule is required for each client-service provider pair, e.g., (src=2a, dst=4a→drop), (src=2b, dst=4b→fwd), etc. For m number of clients and n number of service providers (i.e., devices), existing methodologies would require m×n rules to be stored by, and be accessible from, gateways 3a and 3b (switches/routers 1a, 1b, . . . 1n), where the number of rules increases very fast as the number of client devices (e.g., mobile phones) and service provider devices (e.g., sensors) increases.

As pointed out elsewhere herein, it is desirable to reduce the number of rules that must be generated, stored and accessed by those devices between IoT compatible devices 2a, 2b, . . . 2n and 4a, 4b, . . . 4n (gateways, switches/routers, etc.). In embodiments, to greatly reduce the number of rules the inventors provide for inventive systems, devices and related methodologies for encoding and decoding IoT messages between IoT compatible devices 2a, 2b, . . . 2n and 4a, 4b, . . . 4n.

Greatly simplified, the inventive systems, devices and related methodologies described herein include the generation of an "attribute" label for each packet of a request or response message between IoT devices, where the attribute label may include encoded attributes of the source and destination devices (i.e., service and role attributes). When received by a system or device within network 1 that transports the message, the inventive labels may be mapped to a set of rules, for example.

More particularly, an exemplary, inventive system may comprise a gateway (or another device, e.g., switch/router), such as gateway 3b, that may be operable to generate encoded packets based on an exemplary IoT message it receives from a client device 4a, 4b, . . . 4n. In one embodiment, the message is an IoT request message. Each exemplary encoded packet may comprise inventive "source" and "destination" attribute labels as explained further herein. Further, another system may comprise a gateway, such as gateway 3a, that may be operable to decode each encoded packet it receives from gateway 3b when the gateway 3a is the last hop in a path between client device 4a and service provider device 2a (or vice-versa). Still further, such a system may be operable to convert the encoded source and destination attribute labels in each packet into IoT compatible packets comprising source and destination attributes, and then forward the decoded packets (message) to one or more service provider devices 2a, 2b, . . . 2n as explained further herein. It should be understood that each gateway 3a,3b, . . . 3n may be operable to generate encoded packets that are based on IoT messages and decode, encoded packets to form IoT messages depending on the direction of the original message (i.e., whether a message is a request message from devices 4a,4b, . . . 4n to devices 2a,2b, . . . 2n or a response message from devices 4a,4b, . . . 3n to devices 2a,2b, . . . 2n). Further, it should be understood that as the encoded packet (and its associated encoded message) traverses the core IP network 10 each of the intermediate hops or systems (gateways, routers, switches, central controllers) that is operable to transport the packet (and its associated message) may be operable to receive the encoded packet and complete one or more actions or functions that correspond to a set of rules stored by each system/device, provided, the encoded attributes making up the encoded packet (and its associated message) correspond to such a rule stored by the intermediate device or system as explained further herein.

In the embodiment illustrated by FIG. 1, the gateway 3b may be operable to generate encoded packets based on an IoT request message received from a client device 4a,4b, . . . n that will eventually be decoded by gateway 3a. Similarly, gateway 3a may be operable to generate encoded packets based on an IoT response message from a service provider device 2a,2b, . . . 2n that will eventually be decoded by gateway 3b (as a last hop). As noted above, however, each gateway 3a,3b . . . 3n may be operable to generate encoded packets based on both request and response IoT messages and decode each as well.

Referring now to FIG. 2A, in an embodiment an IoT request message formatted in accordance with an IoT protocol and comprising a plurality of packets may be generated and sent from client device 4a,4b, . . . 4n to the gateway 3b. The gateway 3b may be operable to receive each packet in the IoT request message, including packet 5a illustrated in FIG. 2A, detect client identification information ("client IDs", e.g., bits) in the packet (section 51), map the detected client IDs to stored "role attributes", and then generate an encoded source label for packet 51a (and each packet) that comprises encoded role attributes. The gateway 3b may further be operable to parse or detect ("detect" and "parse" may be used interchangeably herein, unless the context as would be interpreted by those skilled in the art dictates otherwise) service identification information ("service IDs", e.g., bits) in the packet 5a and then generate a encoded destination label that comprises encoded service attributes that correspond to the detected service IDs for packet 51a (and each packet). In an embodiment, both the source label 61b and destination label 62b may be inserted into a header section of an encoded packet 6 formatted in accordance with a core IP protocol (e.g., source address and destination address field in IPv6 packet header, or source MAC address and destination MAC address field in IEEE 802.3 frame header). Thereafter, the encoded packet 6 (bit sequences) may be received and compared to a set of policy rules stored in gateways, routers or switches between the source device 4a and destination device 2a. If the labels correspond to a rule that is stored in a particular gateway, router or switch, for example, then such a system or device may be operable to perform a particular action or function that is dictated by a particular rule.

In the embodiment depicted in FIG. 2A, once the packet 6 which contains the encoded role and service attributes (and, therefore, can be referred to as an "encoded packet" or "encoded message") reaches the last hop, (i.e., gateway 3a), gateway 3a may be operable to decode the encoded packet as well as complete one or more actions that match its stored set of rules. In addition, the gateway 3a may be operable to forward the now decoded packet 5b to the destination device 2a (e.g., a sensor) that is operable to receive the decoded packet (and its associated decoded message). As explained in more detail below, similarly, on a return path, when the gateway 3a receives a packet that is included in an IoT response message from the service provider device or sensor 2a, it may generate an encoded source label 81a based on the corresponding service IDs of the source device (e.g., sensor), and an encoded destination label 82a based on the encoded roles of the destination device (e.g., mobile tablet or hand set 4a).

As is explained in more detail elsewhere herein, once the encoded source and destination labels are generated each must be inserted into a packet that is formatted in accordance with a protocol that is compatible with a core IP network 10 such that it may be transmitted between devices (e.g., gateways 3a,3b) within such a core IP network 10 that may include central controller 100 and switches and routers 1a, 1b, . . . 1n. It should be noted that the inventive labels described herein are not "addresses". That is to say instead of specifying where to route a packet in a network, the inventive labels described herein classify the source and destination devices based on their role and service attributes.

In some embodiments, an IoT device 2a,2b, . . . 2n or 4a,4b, . . . 4n that is connected to a gateway 3a,3b, . . . 3n may or may not have any IP stack. For example, when the IoT devices 2a,2b, . . . 2n or 4a,4b, . . . 4n comprise Wi-Fi compatible devices, such devices have an IP stack. However, when IoT devices 2a,2b, . . . 2n or 4a,4b, . . . 4n comprise Zigbee or BLE devices, such devices do not include an IP stack. Accordingly, in those embodiments where an IoT device 2a,2b, . . . 2n or 4a,4b, . . . 4n does not have IP stack, an ingress gateway 3a,3b, . . . 3n (or another system) that receives and generates encoded packets (e.g., like packet 5a) may be operable to generate an IP header field, insert the generated IP header field into the packet 6 and then insert the inventive, encoded source and destination labels 61b,62b into the IP header field.

As explained in more detail elsewhere herein, in an embodiment gateway 3b may be operable to generate the encoded packet 6 by inserting the inventive labels 61b,62b into respective source and destination address fields 61a,62a (e.g., altered MAC or IP address fields) to route the encoded packet 6. Because either MAC or IP address fields can uniquely identify an IoT device 2a,2b, . . . 2n or 4a,4b, . . .

4n, one of these types of address fields can be altered and then used to insert the inventive labels 61b,62b. In IPv4 networks for example, a MAC address field 61a,62a (48 bits) may be altered and used to insert the inventive labels 61b,62b while in IPv6 networks, a part of IP address field(s) 61a,62a (128 bits) or the entire field(s) can be altered and used to insert the inventive labels 61b,62b.

It should be understood, however, that inventive, encoded source and destination labels described herein (i.e., bit sequences) may be inserted into a number of different positions within a packet 6 that is formatted in accordance with an altered IP core routing format other than those exemplary positions specifically described herein.

As described in more detail elsewhere herein, at the opposite end of the path, another system, such as egress gateway 3a may be operable to receive the encoded packet 6 (as part of an entire encoded message), remove the IP header field(s) and decode the encoded, source and destination labels, The decoded labels are then used to generate a decoded packet that contains source and destination attributes formatted in accordance with an IoT message protocol (e.g., BLE), for example. Thereafter, the gateway 3a may be operable to forward the decoded packet to one or more IoT client devices 4a, 4b, . . . 4n that are operable to receive the decoded packet (and its associated decoded message). Again, it should be understood that each gateway 3a,3b, . . . 3n may be operable to encode and decode packets/messages (e.g., as first and last hops) depending on the direction of the message.

Figure 2B:
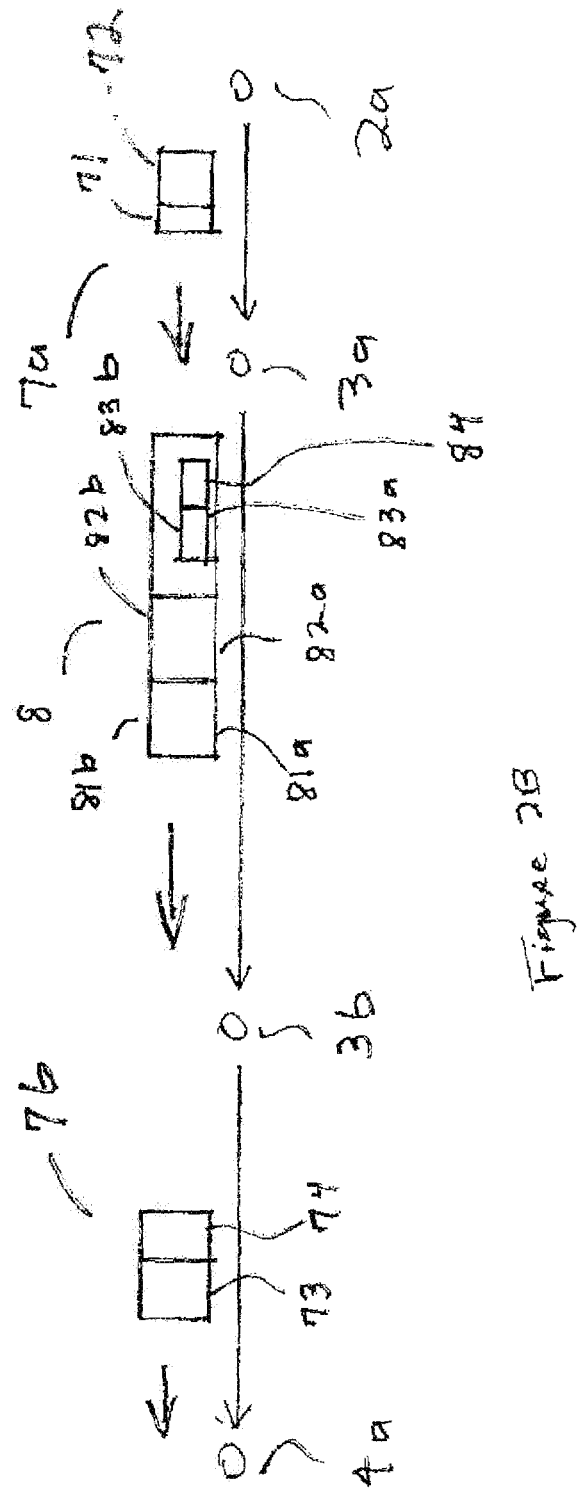
FIG. 2B depicts a simplified "response" message according to an embodiment of the invention.

FIGS. 2A and 2B help illustrate exemplary encoding methodologies of the present invention. In FIG. 2A, an exemplary, inventive encoded packet 6 of an encoded request message is depicted, while in FIG. 2B an exemplary, inventive encoded packet 8 of an encoded response message is depicted. Again, while FIG. 2A depicts a single packet 6 of an encoded request message and FIG. 2B depicts a single encoded packet 8 of an encoded response message it should be understood that a plurality of such packets 6,8 may be included in (and are typically included in) an encoded message that is generated by the methodologies/processes described herein.

Referring again to FIG. 2A, an IoT client device 4a (e.g., a mobile tablet used by a physician) may be operable to output an IoT compatible message (i.e., a message that is formatted in accordance with a specific IoT protocol) that comprises a plurality of packets, one of which is packet 5a. The packet 5a may comprise instructions and content, where (for purposes of this simplified explanation) the instructions (e.g., request or response type indicator bit(s)) may be contained in a request section 51 of the packet 5a and the attributes contained in a content section 52. In an alternative embodiment, the sections may be combined into a single content section, for example.

In an embodiment of the invention, an inventive system 3b, such as an ingress gateway (e.g., hardware gateway device), may be operable to parse the packet 5a in order to detect one or more bits or signals corresponding to an IoT message type (request or response) in the request section 51 and to detect one or more bits or signals (collectively "information") corresponding to attributes in content section 52, where the information may comprise, for example, client IDs related to an IoT source device 4a, and one or more unique service IDs (e.g. UUID) related to an IoT compatible destination device 2a.

Upon detecting the IoT message type bits, the gateway 3b may be operable to determine whether the packet 5a is part of a request or response IoT message based on comparing such bits to reference information for a given IoT message protocol that may be stored in the gateway 3b, for example. In our exemplary scenario, the gateway 3b determines the packet 5a is part of an IoT request message from a client device 4a,4b, . . . 4n (e.g., a physician's mobile tablet).

Thereafter, the gateway 3b may be further operable to compare (sometimes referred to as "map") the detected one or more bits that correspond to client IDs to a plurality of "role" attributes stored in system 3b (for example) to determine which of the one or more roles must be encoded. In addition, the gateway 3b may be operable to determine which of the one or more detected unique service IDs that correspond to specific service attributes must be further encoded. In an embodiment, having determined the role and service attributes in the packet 5a that need to be encoded, the system 3b may be operable to generate a source attribute label based on the detected one or more bits (collectively "information") related to the IoT source device, and generate a destination attribute label based on the detected information related to the IT destination device.

More particularly, to generate the labels the system 3b may be operable to encode the determined role and service attributes using one or more inventive, referential bit sequences stored in the system 3b, for example. The resulting referential bit sequences used to encode respective role and service attributes may be referred to herein as "labels". It should be understood that where the phrase "label" is used herein, each "label" corresponds to one or more bit sequences. Thus, each of the source and destination attribute labels comprise one or more inventive bit sequences. As we shall later see, these bit sequences are derived from minimizing a number of groups of non-conflicting attributes (roles, services) that are associated with a plurality of IoT devices (e.g., 2a,2b, . . . 2n and 4a,4b, . . . 4n) in the network 1.

In an embodiment the stored reference information that is used to determine the IoT message type (for a given IoT protocol) of packet 5a and the plurality of referential bit sequences may be stored by the gateway 3b (and 3a), or may be stored by another system or device (e.g., central controller 100) and provided to the gateway 3b (and 3a), for example. As explained in greater detail elsewhere herein, each one of the plurality of stored, referential bit sequences may represent, or correspond to, a certain role or service attribute or a set of such attributes of IoT devices 4a,4b, . . . 4n and 2a,2b, . . . 2n. In turn, each bit sequence may correspond to one or more rules that are specific to a given network 1. The generation of exemplary, referential bit sequences and their lengths is discussed elsewhere herein. Again, as used herein the phrase "label" means one or more bit sequences that represent, or correspond to labels which in turn, correspond to role and service attributes that may be specific for each network 1 and 10.

Continuing, after determining the one or more stored, referential bit sequences that correspond to the role and service attributes in the packet 5a, the gateway 3b may yet be further operable to generate the encoded packet 6 that comprises at least (1) an encoded source attribute label 61b that comprises the one or more referential bit sequences that were determined to correspond to attributes of the IoT source device 4a, and (2) an encoded destination attribute label 62b that comprises the one or more referential bit sequences that were determined to correspond to attributes of the IoT destination device 2a.

In our exemplary scenario (i.e., a request message), the IoT source device is a client device 4a and the IoT destination device is the service provider device 2a. Accordingly, in an embodiment of the invention the generated, inventive source attribute label 61*b* may comprise "role" attributes of the IoT source device (e.g., mobile phone, laptop, PC or tablet 4*a*) and the generated, inventive encoded destination attribute label 62*b* may comprise "service" attributes of the IoT destination device (sensor 2*a*). Because each attribute label may comprise one or more referential bit sequences, in this embodiment the generated, inventive source attribute label 61*b* may comprise one or more referential bit sequences that correspond to role attributes of the IoT source device 4*a* while the encoded, destination attribute label 62*b* may comprise one or more referential bit sequences that correspond to service attributes of the IoT destination device 2*a*.

Recall that the gateways 3*a*,3*b* communicate using packets that are formatted according to a core IP protocol while the original packet 5*a* may be initially formatted using an IoT protocol (e.g., BLE, Zigbee). Accordingly, the gateway 3*b* may be operable to generate encoded packet 6 in accordance with a format that is compatible with a core IP protocol.

For example, in one embodiment the gateway 3*b* may be operable to generate the encoded packet 6 that comprises an encoded IP source address field 61*a* that includes the inventive source attribute label and an encoded IP destination address field 62*a* that includes the encoded destination attribute label. Said another way, the inventive labels 61*b*, 62*b* may be inserted into fields 61*a*,62*a* that correspond to altered source and destination address fields of a packet 6 that is formatted in accordance with a core IP protocol. The packet 6 that results may be referred to as an encoded request packet 6, and the message that results from one or more similarly converted packets 5*a* may be referred to as an encoded request message. After the gateway 3*b* generates the encoded request message it may forward the encoded request message on to gateway 3*a* (e.g., an egress hardware server) via intermediate network systems and devices (e.g., switches routers 1*a*, 1*b*, . . . 1*n* and controllers 100*a*-*n*).

Backtracking somewhat, in an embodiment the detected IoT message type need not be encoded and inserted into packet 6. Rather, in embodiments of the invention, for a request message a source attribute label comprising one or more bit sequences that correspond to client (role) attributes of an IoT source device may be inserted into a source (address) field of packet 6, while a destination attribute label comprising one or more bit sequences that corresponds to service provider (service) attributes of an IoT destination device may be inserted into a destination (address) field of packet 6. Similarly, for responsive packets (e.g., packet 8) and messages the opposite occurs: a source attribute label comprising one or more bit sequences that correspond to service provider (service) attributes of an IoT source device may be inserted into a source (address) field, while a destination attribute label comprising one or more bit sequences that corresponds to client (role) attributes of an IoT destination device may be inserted into a destination (address) field. In embodiments, to allow a device (gateways 3*a*,3*b*, . . . 3*n*) to distinguish between a source and destination label one or more additional bits may be inserted into packet 6 and positioned, for example, as the most significant bit of an address field (for IPv6, MAC protocols).

In an embodiment of the invention the encoded request packet 6 may further comprise a payload section 63*a* that contains at least data 63*b* that substantially corresponds to original data in packet 5*a*. Though in this embodiment, sections 61*a* to 63*a* and corresponding information 61*b* to 63*b* are shown as separate sections, this is merely exemplary. In another embodiment each of these sections may be combined into less sections (e.g., a single section).

In one embodiment, the gateway 3*b* may be operable to insert the encoded source attribute label 61*b* and the encoded destination attribute label 62*b* into pre-determined, altered IP address fields, and pre-determined positions within such fields, of the packet 6. This embodiment makes use of the fact that the structure (i.e., number of bits, type of bits, location) of the source and destination address fields in an IP protocol formatted packet may be well known by those skilled in the art. Accordingly, in one embodiment, the gateway 3*b* may be operable to insert each of the respective, inventive, encoded source and destination attribute labels into pre-determined, respective positions within the respective altered source and destination address fields.

Alternatively, rather than insert the encoded source and destination attribute labels into pre-determined positions within source and destination address fields, the inventive gateway 3*b* may be operable to insert the encoded source and destination attribute labels 61*b*,62*b* into other altered fields other than the address fields provided, of course, that such other fields are of a sufficient length to accommodate a particular encoded source and destination attribute label.

Still further, in another embodiment, the inventive gateway 3*b* may be operable to insert the encoded source and destination attribute labels 61*b*,62*b* into randomly determined positions in the source and destination address fields 61*a*,62*a*, respectively, or insert the encoded source and destination attribute labels 61*b*,62*b* into randomly determined positions in fields other than the source and destination address fields, respectively. That is to say to say, an inventive system, such as system 3*b*, may be operable to change the position where the encoded source and destination attribute labels are inserted in a given packet provided, of course, that information regarding the randomly selected positions are also provided to a decoding system 3*a*, such as an egress gateway, using, for example, a separate communications pathway or channel or additional bits in the encoded packet or its corresponding message that indicate a methodology of decoding the randomly positioned labels (not shown in figures).

We now turn to a discussion of an exemplary method for decoding an encoded, packet 6 (and message) into a message at a last hop (for example) that is compatible with an IoT protocol. In our exemplary scenario, this may be completed by the system 3*a*. In an embodiment, the system 3*a* may be operable to receive the encoded packet 6 and detect the encoded source attribute label 61*b* within altered field 61*a* (e.g., within the source address field) and the encoded destination attribute label 62*b* within altered field 62*a* (e.g., within destination address field 62*a*) in an IP header section (for example), wherein each of the labels 61*b*,62*b* may comprise one or more referential bit sequences that correspond to role and service attributes, respectively, of IoT compatible source and destination devices 4*a*, 2*a*, respectively. More particularly, as explained elsewhere the one or more bit sequences are derived from minimizing a number of groups of non-conflicting attributes that correspond to a plurality of IoT devices in the IoT network 1.

In an embodiment, upon detecting the source attribute label 61*b* (referential bit sequences) that corresponds, in this example, to encoded role attributes, the device 3*a* may be operable to compare the label 61*b* to a plurality of stored, referential bit sequences to determine the role attributes that correspond to the IoT compatible source device 4*a*. Thereafter, the system 3*a* may be operable to map the so-determined role attributes to corresponding client IDs.

It should be appreciated that when the source is a service provider device, and not a client device, upon detecting a source attribute label (referential bit sequences) that corresponds, in this example, to encoded service attributes, a device (e.g., gateway 3b) may be operable to compare the label to a plurality of stored, referential bit sequences to determine the service attributes that correspond to the IoT compatible source device. Thereafter, the system may be operable to map the so-determined service attributes to corresponding service IDs.

In addition, upon detecting the label 62b (referential bit sequences) that corresponds to encoded service attributes, the device 3a may be operable to compare the label 62b to a plurality of stored, referential bit sequences to determine the unique service IDs that correspond to the IoT compatible source device 4a.

It should be appreciated that when the destination is a client device, and not a service provider device, upon detecting a destination attribute label (referential bit sequences) that corresponds, in this example, to encoded role attributes, a device (e.g., gateway 3b) may be operable to compare the label to a plurality of stored, referential bit sequences to determine the role attributes that correspond to the IoT compatible destination device. Thereafter, the system may be operable to map the so-determined role attributes to corresponding client IDs. Thereafter, the device 3a may be further operable to generate a decoded packet 5b that is formatted in accordance with an IoT protocol and that comprises decoded source and destination attributes, where (for purposes of this simplified explanation) the instructions may be contained in a request section 53 of the packet 5b and the attributes contained in a content section 54. In an alternative example, the instructions need not be included and/or the sections may be combined into a single content section for example. This process continues until each encoded packet 6 of the encoded message is decoded. Once this is done the gateway 3a may be operable to forward the decoded request message containing all of the decoded packets and their attributes (such as packet 5b) to the service provider device 2a (e.g., to a sensor) that is operable to receive the decoded packet (and its associated decoded message), where, as explained in more detail herein, the attributes are derived from minimizing a number of groups of non-conflicting attributes that correspond to a plurality of IoT devices in the IoT network.

Up until now our discussion has focused primarily on the encoding and decoding of packets of an IoT request message. A similar methodology may be implemented by systems 3a,3b (e.g., hardware gateways) when an IoT response message is generated by the service provider device 2a (e.g., sensor) in reply to a decoded request message.

In more detail, referring now to FIG. 2B, an inventive, exemplary system 3a (e.g., hardware gateway device) may be operable to receive an IoT response message that comprises a plurality of packets, one of which is packet 7a. The packet 7a may comprise instructions and content, where (for purposes of this simplified explanation) the instructions (IoT message type, i.e., response) may be contained in a response section 71 of the packet 7a and the content (attributes) contained in a content section 72. In an alternative embodiment, these sections may be combined into a single content section, for example.

In an embodiment of the invention, an inventive system 3a, such as an ingress gateway (e.g., hardware gateway device), may be operable to parse the packet 7a in order to detect one or more bits or signals corresponding to the IoT message type (request or response) and to detect one or more bits or signals corresponding to one or more attributes (e.g., unique service IDs (e.g. UUID) of an IoT source device 2a and one or more client IDs an IoT compatible device 4a).

Upon detecting the IoT message type bit(s), the gateway 3a may be operable to determine whether the packet 7a is a request or response message based on comparing such bits to reference information for a given IoT protocol that may be stored in the gateway 3a, for example. In our exemplary scenario, the gateway 3a determines the packet 7a is part of a response message from a service provider device 2a,2b, . . . 2n.

Thereafter, the gateway 3a may be further operable to detect one or more bits that correspond to client IDs and compare the so detected bits to a plurality of role attributes stored in system 3a (for example) to determine which role attributes should be further encoded. In addition, the gateway 3a may be operable to parse the packet 7a to detect the unique service IDs that correspond to specific service attributes to determine which attributes should be further encoded.

In an embodiment, having determined the role and service attributes in the packet 7a that need to be encoded, the system 3a may be operable to encode the determined role and service attributes using inventive referential bit sequences stored in the system 3a, for example.

Again, one or more of the inventive referential bit sequences that are stored in the gateways 3a,3b, . . . 3n may be used to generate a "label".

Both the stored information related to a given IoT message type (for a given IoT protocol) and the plurality of stored, referential bit sequences (labels) may be stored by the gateway 3a (and 3b), or may be stored by another system or device and provided to the gateway 3a (and 3b), for example. As explained in greater detail elsewhere herein, each one of the plurality of stored, referential bit sequences may represent, or correspond to, a certain role or service attribute or a set of attributes of IoT devices 4a,4b, . . . 4n and 2a,2b, . . . 2n which, in turn, correspond to one or more rules. The generation of exemplary, referential bit sequences and their lengths are discussed elsewhere herein.

Continuing, after determining the one or more stored, referential bit sequences that correspond to the role and service attributes in the packet 7a, the gateway 3a may yet be further operable to generate an encoded packet 8 that comprises at least (1) an encoded source attribute label 81b that comprises the one or more referential bit sequences that were determined to correspond to attributes of the IoT source device 2a, and (2) an encoded destination attribute label 82b that comprises the one or more referential bit sequences that were determined to correspond to attributes of the IoT destination device 4a.

In our exemplary scenario (i.e., a response message), the IoT source device is a service provider device 2a and the IoT destination device is the client device 4a. Accordingly, in an embodiment of the invention the generated, inventive source attribute label 81b may comprise service attributes of the IoT service provider device (e.g., sensor 2a) and the generated, inventive encoded destination attribute label 82b may comprise role attributes of the IoT client device (laptop, mobile phone, tablet, PC 4a). In an embodiment, because each attribute label may comprise one or more referential bit sequences, the generated, inventive source attribute label 81b may comprise one or more referential bit sequences that correspond to service attributes of the IoT source device 2a while the encoded, destination attribute label 82b may comprise one or more referential bit sequences that correspond to role attributes of the IoT destination device 4a.

Recall that the gateways 3a,3b communicate using packets that are formatted according to a core IP protocol while the original packet 7a may be initially formatted using an IoT protocol (e.g., BLE, Zigbee). Accordingly, the gateway 3a may be operable to generate encoded packet 8 in accordance with the format that is compatible with a core IP protocol.

For example, in one embodiment the gateway 3a may be operable to generate the encoded packet 8 that comprises an encoded, altered IP source address field 81a that comprises the inventive source attribute label and an encoded. altered IP destination address field 82a that comprises the encoded destination attribute label. Said another way, the inventive labels 81b,82b may be inserted into altered fields 81a,82a that correspond to source and destination address fields of a packet 8 that is formatted in accordance with a core IP format. The packet that results may be referred to as an encoded response packet 8, and the message that results from one or more similarly converted packets 7a may be referred to as an encoded response message. After the gateway 3a generates the encoded response message it may forward the encoded response message on to gateway 3b (e.g., an egress hardware server) via intermediate systems and devices (e.g., switches, routers 1a, 1b, . . . 1n and central controllers 100a-n) for decoding as explained in more detail below.

In an embodiment of the invention the encoded response packet 8 may further comprise a payload section 83a that contains data 83b that substantially corresponds to the original data in packet 7a. Again, in an alternative embodiment sections 81a to 83a and information 81b to 83b may be combined in fewer sections (e.g., one section).

As mentioned previously, the inventive labels 81b,82b (i.e., their referential bit sequences) may be inserted into altered fields 81a, 82a within the encoded response packet 8 that is formatted in accordance with a core IP protocol. The system 3a may be operable to execute a number of different stored instructions that correspond to a number of different methodologies to form encoded packet 8. In one embodiment, the gateway 3a may be operable to insert the encoded source attribute label 81b and the encoded destination attribute label 82b into pre-determined, altered IP address fields, and pre-determined positions within such fields, in the packet 8. This embodiment makes use of the fact that the structure (i.e., number of bits, type of bits, location) of the source and destination address fields in an IP packet formatted in accordance with an IP protocol may be well known by those skilled in the art. Accordingly, in one embodiment, the gateway 3a may be operable to insert each of the respective, inventive, encoded source and destination attribute labels into pre-determined, respective positions within the respective, altered source and destination address fields.

Alternatively, rather than insert the encoded source and destination attribute labels (i.e., bit sequences) into pre-determined positions within source and destination address fields, the inventive gateway 3a may be operable to insert the encoded source and destination attribute labels 81b,82b into fields other than the address fields, provided, of course, that such other fields are of a sufficient length to accommodate a particular encoded source and destination attribute label Yet further, in another embodiment, the inventive gateway 3a may be operable to insert the encoded source and destination attribute labels 81b,82b into randomly determined positions in the source and destination address fields 81a,82a, respectively, or insert the encoded source and destination attribute labels 81b,82b into randomly determined positions in other altered fields other than the source and destination address fields, respectively.

That is to say to say, an inventive system, such as system 3a, may be operable to change the position where the encoded source and destination attribute labels are inserted in the packet 8 provided, of course, that information regarding the randomly selected positions are also provided to a decoding system 3b, such as an egress gateway, using, for example, a separate communications pathway or channel or additional bits in the encoded packet 8 or its corresponding message that indicate a methodology of decoding the randomly positioned labels (not shown in figures).

We now turn to a discussion of an exemplary method for decoding an encoded response packet 8 (and message) into a message that is compatible with an IoT protocol which, in our exemplary scenario, may be completed by the system 3b as a last hop. In an embodiment, the system 3b may be operable to receive the encoded packet 8 (and each and every packet within the encoded response message) and detect the encoded source attribute label 81b within altered field 81a (e.g., within the source address field) and the encoded destination attribute label 82b within altered field 82a (e.g., within destination address field 82a) in an IP header section (for example), wherein each of the labels 81b,82b may comprise one or more referential bit sequences that correspond to service and role attributes, respectively, of IoT compatible source and destination devices 2a, 4a, respectively.

In an embodiment, upon detecting the label 81b (referential bit sequences) that corresponds to encoded service attributes, the device 3b may be operable to compare the label 81b to a plurality of stored, referential bit sequences to determine the unique service IDs (e.g., UUIDs) that correspond to the encoded service attributes of source device 2a.

In addition, upon detecting the label 82b (referential bit sequences) that corresponds to encoded role attributes, the device 3b may be operable to compare the label 82b to a plurality of stored, referential bit sequences to determine the role attributes that correspond to the IoT compatible destination device 4a. Thereafter, the system 3b may be operable to map the so-determined role attributes to corresponding client IDs.

Subsequently, the device 3b may be operable to generate a decoded packet 7b that comprises instructions (IoT message type) and content (attributes), where (for purposes of this simplified explanation) the instructions may be contained in a request section 73 of the packet 5b and the attributes contained in a content section 74. In an alternative embodiment the sections may be combined into a single content section for example.

In an embodiment, the attributes may comprise the determined, decoded client IDs and unique service IDs corresponding to attributes of the IoT source and destination devices 2a,4a. This process continues until each encoded packet 8 of the encoded response message is decoded. Once this is done the gateway 3b may be operable to forward the decoded response message containing all of the decoded packets (such as packet 7b) to the client device 4a (e.g., to a laptop, PC, mobile phone, tablet).

Having provided some examples of inventive embodiments that describe encoding and decoding of messages between IoT devices that make use of inventive, referential bit sequences we now turn to a discussion that presents some embodiments that are directed at the generation of the inventive, referential bit sequences (i.e., the labels) and how they may be used by systems and devices that also transport an encoded IoT message.

In the greatly simplified hospital scenario described above each service provider device or sensor 2a,2b, . . . 2n was associated with a single service (i.e., either heart-rate monitoring or temperature monitoring). However, as the reader can appreciate there may be instances when a single device 2a, 2b, . . . 2n may be associated with multiple services.

For example, assume that each sensor 2a,2b . . . 2n utilizes a battery for providing power, and that it is desirable to monitor the power level of each device. Accordingly, for purposes of the present explanation such monitoring can be categorized as an additional "service" such that each temperature and heart rate sensor 2a,2b, . . . 2n in our illustrative example can now be said to provide two different services, either battery monitoring and temperature monitoring or battery monitoring and heart rate monitoring.

Further, for purposes of our discussion, assume that there is a set of policies in effect that govern access to each service. For example, 1) only Physicians (P) can access data from the heart-rate service, and ii) only those designated as Administration (A) can access data from the temperature monitoring service and battery monitoring service. Because each particular sensor 2a,2b, . . . 2n now provides, and is associated with, two different services, and the rule for accessing each service is different, it will be apparent to those skilled in the art that reliance upon existing, conventional source and destination address methodologies to implement a set of access rules for systems and devices throughout network 1 is not practical. Instead, the inventors recognized that what was needed was a methodology that identifies all of the various services (and roles) that may be included in a particular request or response message associated with a particular transaction (where again, a "transaction" typically includes a request and response message, or at least one of them).

As is known by those skilled in the art, in accordance with established IoT protocols, service IDs are already included in IoT messages, where the service IDs uniquely identify a particular service. Referring back to the encoding and decoding embodiments described previously, the service IDs may be contained in the content sections of an IoT formatted request or response packet 5a,7a (and 5b,7b as well) and are referred to as service attributes. For example, the unencoded service attributes may comprise a BLE, Universally Unique ID (UUID) or a Cluster ID in Zigbee etc. Such service IDs are typically embedded in a transmission packet (e.g., Zigbee Cluster ID is part of ZCL header in the packet), or can be derived from such a packet (e.g., BLE UUID can be derived by mapping a handle-index to UUID).

Given the above, a number of potential methodologies were considered by the inventors. Those that required complex parsing were not adopted. Instead, the inventors discovered that "attribute" labels that represent services or roles (e.g., the inventive bit sequences) could be generated and used by systems and devices within network 1 (e.g., gateways 3a,3b, . . . 3n, switches/routers 1a, 1b, . . . 1n) to permit substantially all policy rules to be applied based on such a label. Further, the inventors discovered that parsing may only need to be done once per packet, thus allowing policy rules to be applied anywhere on the pathway(s) that a packet travels.

The inventors recognized that their inventive attribute labels should represent the services or roles set forth in a packet. However, the inventors also recognized that embedding existing service IDs or client IDs directly in an attribute label would not work because a packet may contain information corresponding to multiple services and/or roles, and, making matters even more complicated, such services or roles may appear in the packet in an arbitrary order. Further, the inventors recognized that if a label contained a sequential list of existing service IDs or client IDs, then a corresponding label may require the use of too many bits (electrical signals) to represent such a list of services or roles. Still further, the nondeterministic location of each service or role would also make it difficult to do wildcard-based rule matching.

Accordingly, the inventors recognized that a more carefully designed methodology that minimized the length of an attribute label (i.e., minimized the number of bits in a bit sequence that represents attributes) while still avoiding attribute conflict patterns was desirable and necessary.

In developing the methodologies for generating their inventive, stored referential bit sequences for a given network of IoT devices, users and policies the inventors first considered a generalized network that has n attributes, where i is an index for the n attributes. Further, the inventors realized that each IoT device within the network could be associated with a subset of the n attributes, where any device may be associated with m potential subsets denoted by $s_1, s_2, \ldots, s_m$. At each system or device (e.g., gateway, switch, router, central controller) in the network 1 there are a set of rules that map m subset of attributes to some action by such a system or device.

With the above in mind, the inventors realized that when an encoded packet reached a system or device in the network 1, such a system or device that is transporting the packet should be operable (and in accordance with embodiments of the present invention, is operable) operable to receive an encoded, also detect the packet's inventive label (bit sequences), compare the detected label to stored, referential information (bit sequences), and then further determine that if the comparison results in a match, then the rules that correspond to the matched referential information may be completed by the system or device. Said another way, if the packet's label corresponds to a rule stored by a system or device in the network 1, then the inventive system may be operable to not only further transport the packet, but to also complete the action or function corresponding to the rule. It should be noted that a particular encoded packet can correspond to multiple rules. In order to determine whether an encoded label within an encoded packet matches a particular rule, the inventive system or device (e.g., gateways 3a,3b . . . 3n, switches/routers 1a, 1b, 1n or central controllers 100a-n)) may execute a stored Matching with Don't Cares (MDC) process to compete the exemplary comparisons. In this approach, the inventive system or device may be operable to first set a digital "mask" length that corresponds to a given rule that is equal to the bit-length that corresponds to the number of bits in the detected label (i.e., bit sequences making up a label), and then apply the digital mask to generate an intermediate encoded label that comprises (1) bits that indicate that the label includes attributes that match those present in a given rule (e.g., binary "1" bits), and (2) bits that indicate that the label does not includes attributes that match those present in a given rule, so called "don't care" bits (e.g., binary "0" bits). This process may be repeated by applying a plurality of stored digital masks (bit sequences), which generates a plurality of intermediate labels. In an embodiment, when the bits (bit sequences) in an encoded packet's label matches the bits of a particular digital mask substantially exactly, then the system stores an indication that the label matches a rule associated with the particular, matched digital mask and this, in turn, would trigger the completion of a particular action or function by the system or device.

Summarizing the last few paragraphs the invention provides for devices that transport encoded IoT messages (e.g., switches/routers 1a, 1b, . . . 1n), where such devices may be operable to (i) receive an encoded packet comprising encoded source and destination attributes of IoT devices that are based on minimizing a number of groups of non-conflicting attributes that correspond to a plurality of IoT devices of an IoT network, (ii) compare the encoded attributes to one or more stored digital masks to determine if the attributes correspond to one or more stored rules, and (iii) complete one or more actions or functions that correspond to the rules if the comparison indicates that the attributes correspond to one or more stored rules.

Said another way, it should be understood that each inventive system, such as gateways 3a,3b . . . 3n, switches/routers 1a, 1b, 1n or central controllers 100a-n, that is involved in the transport of an encoded packet may be operable to execute instructions stored in memory to complete those functions and actions that correspond to rules that match a received bit sequence (label).

The challenge presented to the inventors was to discover an inventive methodology that enables the practical use of an MDC process (and its corresponding masks) at systems or devices in the network 1 (gateways, switches, routers, central controllers) used to transport encoded packets (messages), where each stored rule (and its associated mask or bit sequence) may correspond to any one of n attributes or any of its attribute subsets (i.e., $s_1$, $s_2$, . . . , $s_m$). Some examples of inventive methodologies discovered by the inventors are now described.

Addressing Mechanism:

To discover the inventive methodologies, the inventors assumed that there exists a b bit label space for packets from each IoT device, and that each attribute (service, role) of an IoT device may be allocated to a subset of these b bits. In an embodiment, a labeling process that may be used is:

The b bits are partitioned or grouped into k fragments $l_1$, $l_2$, . . . , $l_K$ such that, $$\sum_{k=1}^{K} \ell_k = b.$$

Thus, partition (group) k has $l_K$ bits and therefore there are potentially $2^{l_k}$ unique representations corresponding to these $l_K$ bits. In an embodiment, each attribute of an IoT device may be mapped to one of these K fragments and may be assigned a binary representation in the fragment. The inventors discovered, however, that constraints have to be imposed on such mapping. For example, if two attributes i and j are both present in the same subset (i.e., subgroup) then they cannot be assigned to the same partition (group). In order to take this into consideration, the inventors discovered that inventive solutions that took such conflicts into consideration to could be realized by constructing a conflict graph.

Exemplary Conflict Graph:

In an embodiment, each node in an inventive conflict graph corresponds an attribute of an IoT device. Further, an "edge" may be present between nodes i and j in a conflict graph if there exists a subset p such that i, j ∈ $s_p$. Said another way, an edge represents attributes that are associated with the same IoT device.

Continuing, the inventive methodology proceeds to partition or group the nodes (attributes) in the conflict graph into K fragments where two nodes can be mapped to the same fragment only if there is no edge between the two nodes in the conflict graph. Further, if t nodes are mapped to a particular fragment k then this fragment needs $l_k = \lceil \log_2 t \rceil$ bits to represent all the nodes mapped to it.

It should be understood that one goal of the conflict graph is to place as many, non-conflicting nodes (attributes) within the same partition or group. By doing so the inventors discovered that a minimum number of partitions or groups representing all attributes of a given set of IoT devices in a particular network could be generated. In addition, as described elsewhere herein, once the minimum number of partitions or groups were generated, the inventors then discovered methodologies to assign a unique, referential bit sequence to each generated partition or group. Because the inventors had generated a minimum number of partitions or groups that represent all attributes of a given set of IoT devices, the number of referential bit sequences that were generated were also a minimum (i.e., the fewer the number of partitions, the fewer the number of bit sequences). Compared to existing methodologies, this leads to a substantial reduction in electronic memory (fewer bit sequences have to be stored by each system, such as gateways 3a,3b, . . . 3n, switch/router 1a, 1b, . . . 1n or central controller 100a-n) and the time required to encode IoT packets is also reduced due to the use of a fewer number of bit sequences.

In an embodiment, the inventors discovered inventive attribute mapping and comparison methodologies that assign a unique, referential bit sequence to each generated partition or group. Said another way, the inventors discovered attribute mapping/comparison methodologies that generate the referential bit sequences that comprise a minimum number of bits, where each bit sequence represents one or more, non-conflicting attributes of IoT devices, such as devices 2a,2b, . . . 2n and 4a,4b, . . . 4b in a network.

As mentioned previously, the inventive methodologies discovered by the inventors generate a minimum number of bit sequences. In addition, the sequences also use a minimum number of bits.

In an exemplary embodiment, to determine an inventive attribute mapping methodology that generates referential bit sequences that comprise a minimum number of bits the inventors defined the value:

$$x_{ik} = \begin{cases} 1 & \text{if attribute } i \text{ is assigned to partition } k \\ 0 & \text{Otherwise} \end{cases}$$

Using the above notation, the inventors represented the attribute mapping problem as follows:

$$\text{minimize:} \sum_{k=1}^{n} \left\lceil \log_2 \left( \sum_i x_{ik} \right) \right\rceil \quad \text{Equation (1)}$$

$$\text{subject to: } x_{ik} + x_{jk} \leq 1 \quad \forall (i, j) \in CG \ \forall k$$

$$x_{ik} \in \{0, 1\} \quad \forall (i, k)$$

The inventors discovered that to arrive at inventive mapping/comparison methodologies they had to solve a non-convex problem represented by Equation (1) above. In an embodiment, the inventors discovered that the application of two different heuristic processes solved the non-convex problem, where both processes used a "greedy" approach to generate referential bit sequences that comprise a minimum number of bits that could be used as source and destination attribute labels by inventive systems, such as gateways $3a, 3b, \ldots 3n$, for example.

Process #1: Greedy Selection Process:

In this process, each of the attributes from the conflict graph(s) described previously herein are assigned to a partition (group). In an embodiment, the process initializes the number of partitions/groups to zero. Thereafter, the process randomly permutes the attributes and considers one attribute at a time. For example, the process attempts to assign each attribute (e.g., service, role) to the largest, existing feasible partition/group, where there is no conflict (i.e., edge) with other attributes in that partition. Once every attribute is assigned, the process continues by assigning a unique, referential bit sequence to each partition/group and then calculates the total bit length of the longest bit sequence currently assigned to a generated partition/group. In an embodiment, the steps of assigning attributes to partitions/groups and assigning a unique, referential bit sequence to each generated partition/group may be repeated until such time as the process determines a minimum bit length for a referential bit sequence. Said another way, the process tries different permutations of attribute sequences (i.e., P) to find out the minimum bit-length that may be used to generate source and destination labels. An embodiment of the inventive process can be represented by the steps below, where the process, S(k), represents the set of attributes assigned to partition, k, and N(i) represents neighboring nodes (i.e., attributes) of a node (i.e., attribute) i in a conflict graph, G:

---

Algorithm 1: Greedy selection labeling algorithm

Input: Conflict Graph G
Output: Labeling of nodes in G
M ← ∞
P* = null
for t = 1, 2, . . . T do
    K = 0
    P = Generate permutation of attributes
    for i = $P_1, P_2, \ldots P_n$ do
        F = {k : S(k) ∩ N (i) = ∅}
        k* = $\text{argmax}_{k \in F}$|S(k)|
        if k* ≠ 0 then
            S(k*) = S(k*) ∪ i
        end
        else
            K ← K + 1
            S(K) = i
        end
    end
    B = $\Sigma_{k=1}^{K} \lceil \log_2 |S(k)| \rceil$
    if B < M then
        M ← B
        P* = P
    end
end

---

Said another way, in an embodiment, to minimize the number of groups (and, therefore, the number of later assigned, corresponding referential bit sequences) the process attempts to assign each attribute to the same partition/group. Further, in this embodiment each attribute will be assigned to the same group unless the process determines that the assignment of a particular attribute to a particular partition/group may result in a conflict. In an embodiment, if the process determines that a conflict may occur, then the attribute is not assigned to that partition/group. Thereafter, the process attempts to assign the attribute to the next, existing partition/group. The process continues until the attribute is either assigned to an existing partition/group that does not contain a conflicting attribute or until a new partition or group is created to assign the attribute to.

It should be understood that each of the processes described herein, such as the generation of conflict graphs, application of the Greedy Selection process or the Maximum-Independent Set Based Addressing process (described below), may be implemented by a system, such as central controller 100, that is operable to execute instructions stored as electronic signals in electronic memory. Further, each process may be completed at the time the network of IoT devices $2a, 2b, \ldots 2n$ and $4a, 4b, \ldots 4n$ are put into service. Said another way, in an embodiment of the invention, inventive systems (e.g., central controller 100) may be operable to generate a set of inventive referential bit sequences that are unique to, and represent, the attributes of the IoT devices $2a, 2b, \ldots 2n$ and $4a, 4b, \ldots 4n$ in a network based on retrieving and executing stored instructions that represent the Greedy Selection or MIS process that are stored as electronic signals in electronic memory. In an embodiment the instructions may be stored in electronic memory that is integral to a system (e.g., central controller 100) or may be stored in electronic memory that is separate from such a system. After generating the inventive bit sequences, the central controller 100 may be operable to store the so generated sequences and to distribute the so generated sequences to gateways $3a, 3b, \ldots 3n$ and switches/routers $1a, 1b, \ldots 1n$ in network 1 which are operable to receive the sequences and store them for later use in order to transport encoded packets 6,8 (and corresponding messages) through network 1 and for encoding/decoding IoT messages.

Process #2. A Maximum-Independent Set Based Addressing Process:

The inventors also discovered a maximum independent set (MIS) process for generating inventive, referential bit sequences that can be used to generate source and destination labels for encoding/decoding IoT messages.

In an embodiment, one MIS process identifies maximal independent sets (i.e., least non-conflicting attributes) in a conflict graph, such as the one previously described herein.

The exemplary MIS process can be represented by the steps below, where (i) E_G(v) represents the set of (undirected) edges incident on node v in graph G, (ii) N_G(v) represents the set of neighbors of attribute v in graph G, and (iii) V and E are the set of nodes (i.e., attributes) and edges in the conflict graph respectively:

---

Algorithm 2: Independent Set Based labeling algorithm

Input: Conflict Graph G
Output: Labeling of nodes in G
k ← 1
while G ≠ ∅ do
    S(k) = ∅
    G' ← G
    V' ← V
    E' ← E
    while (G' ≠ ∅) do
        v = Arg $\min_{v \in G'}$|$N_{G'}$ (u)|
        L(v) = k
        S(k) = S(k) ∪ v
        V' ← V' \ (v ∪ $N_{G'}$(v))
        E' ← E' \ $E_{G'}$(v)
        G' = (V' , E')
    end

| Algorithm 2: Independent Set Based labeling algorithm |
| --- |
|     \|      V ← V\S(k) <br>     \|      E ← E\E_{G'} (S(k)) <br>     \|      G = (V,E) <br>     \|      k ← k + 1 <br>     end |

In more detail, this inventive process identifies, for each partition (i.e., group) k, a set of nodes S(k) (i.e., attributes) that have minimum number of neighbors in a current conflict graph (G'), and which do not have a conflict with each other in the set S(k). However, before selecting such a node (attribute) from a set of nodes in the graph and assigning it to a partition (i.e., a group of attributes), the process first removes all the nodes (attributes) and their corresponding edges (i.e., attributes shared by the same IoT device) from the conflict graph that were previously assigned to partitions. The result is that a revised conflict graph is generated. Thereafter, a node (attribute) may be selected from a set of nodes S(k) (i.e., attributes) that remains in the revised graph that has minimum number of neighbors and assigned to a partition (i.e., a group of attributes). This process of first removing nodes (attributes) that have been previously assigned to a partition to create a revised graph, selecting a node from a set of nodes S(k) (i.e., attributes) that remains in the revised graph that has minimum number of neighbors, and then assigning the node (attribute) to a partition (group of attributes) using a Greedy Selection process continues until a conflict graph (G) is generated that contains no nodes because each node (attribute) has been assigned to a partition (group of attributes).

In both processes, it should be understood that S(k) represents the set of nodes (attributes) assigned to the partition, k. Based on the number of nodes (attributes) in S(k), we allocate $l_k$ bits for the partition k, where, $l_k = \lceil \log_2 |S(k)| \rceil$. In such a case, a partition k may be assigned one of $2^{l_k}$ possible unique referential bit sequences to represent the attributes in the partition k. It should be noted that after all of the attributes have been assigned to a partition, some partitions may not be at their maximum capacity (i.e., the number of attributes allotted to a group may not have been reached). Accordingly, in such an instance, the inventors provide an additional inventive process that re-arranges the assigned attributes from one partition (group) to another in order to make use of the extra capacity. As a result, the number of partitions and the number of corresponding bits in a referential bit sequence or the number of referential bit sequences is further reduced versus existing methodologies.

The Process of Re-Arranging Attributes:

In an embodiment, after nodes (attributes) from a conflict graph have been assigned to a different partition using either process described above (Greedy Selection alone, or in combination with the MIS) nodes (attributes) that have been assigned to one partition may be re-assigned to another partition that has extra capacity. Recall that each referential bit sequence that has been assigned to a partition is unique, and uniquely represents each of the attributes that have been assigned to the partition. Thus, when a node (attribute) is removed the referential bit sequence may change. In an embodiment, the referential bit sequence that will now be assigned to the partition from which the node (attribute) was removed will be shortened. For example, FIG. 3 depicts a simplified illustration of an exemplary re-arrangement of attributes. For purposes of our example, we shall assume an inventive conflict graph 300 that includes 8 attributes identified as "A" through "H" has been generated. Further, we shall assume that one of the processes described above (Greedy Selection process or MIS/Greedy selection process) has been completed and results in the partitions 300a, 300b and 300c, where nodes (attributes) B, H, A, E and F have been assigned to partition 300a, nodes (attributes) D, C have been assigned to partition 300b, and node (attribute) G has been assigned to in partition 300c. It should be understood that for the sake of our example, each node/attribute has been represented by a letter from A to H. In practice, each of these letters represents an actual attribute of a device 2a,2b, . . . 2n and 4a 4b, . . . 4n (e.g., a role or service)

Without further re-arrangement, bits may be assigned to each partition as follows: a single bit may be assigned to represent partition 300c because it contains a single node (attribute); similarly because partition 300b only contains two nodes a single bit is assigned to represent it in binary coding; and 3 bits (again, binary coding) may be assigned to represent partition 300a because it includes 5 nodes. Accordingly, without re-arrangement of nodes from one partition to another, the total number of bits in a referential bit sequence that is required to represent partitions 300a, 300b and 300c is 5 (i.e., a bit sequence length of 5). However, in accordance with an inventive embodiment the length of the referential bit sequence may be reduced by re-arranging (re-assigning) nodes to different partitions. For example, node F may be moved from partition 300a to partition 300c because partition 300c has extra capacity. As a result, partition 300a has one less node, partition 300b remains unchanged and partition 300c includes one more node. In an embodiment, though the number of nodes within partition 300c increases, the number of bits needed to represent it does not—it remains a single bit. However, by removing node F from partition 300a the number of bits needed to represent partition 300a is reduced from 3 bits to 2 bits and the overall number bits needed to represent partitions 300a,300b and 300c is reduced from 5 to 4 bits (i.e., the length of the referential bit sequence is reduced from 5 to 4).

Renumbering Labels:

The inventive encoding methodologies described herein also take into consideration the fact that IoT devices may be added and subtracted from an IoT network, or the services provided by, or roles of, an IoT device already in the network may change both of which may dictate a change in attributes. This leads to changes to the stored referential bit sequences that are based on such attributes and are used to transport and encode/decode messages between IoT devices.

In an embodiment, when a new IoT device is added a system, such as central controller 100 (or, alternatively, gateways 3a,3b, . . . 3n or switches/routers 1a, 1b, . . . 1n) may be operable to retrieve and execute instructions stored as electronic signals in electronic memory to generate a new attribute conflict graph by, for example, adding new nodes and/or edges to a conflict graph and then generating new referential bit sequences that will be stored and then used to generate source and destination labels that will encode/decode an IoT packet (and message). Similarly, when an existing IoT device is removed from a network (or when services/roles change) a system, such as central controller 100 for example, may be operable to retrieve and execute instructions stored as electronic signals in electronic memory to substantially immediately (in real-time) generate a new attribute conflict graph by, for example, removing new nodes and/or edges to a conflict graph. Unlike the addition of new devices, however, when nodes and edges are removed from a conflict graph there may not be a need to immediately generate new referential bit sequences because existing bit sequences (and their corresponding labels) may still function appropriately. Further, in an embodiment, the conflict graph that is generated when devices are removed (or when services/roles change) will eventually be taken into consideration when attributes (IoT devices, services/roles) are added to the network.

In an embodiment, when changes are made to an IoT network (e.g., when IoT devices are added) a system, such as central controller 100, may be operable to make a relatively few changes to the stored, referential bit sequences (and corresponding labels) by re-arranging attributes within partitions as explained previously above to account for the changes. On the other hand, certain changes to an IoT network may require a system, such as central controller 100, to make a large number of changes to the stored, referential bit sequences (and corresponding labels). Realizing this, the inventors discovered an incremental process that requires a system, such as central controller 100, to make minimal changes to existing referential bit sequences and their corresponding labels when new IoT devices and their corresponding attributes are added to an existing network, as represented by the process below:

---
Algorithm 3: Old/New attribute re-assign/assign to the partition segment
---

Input: Attribute n
Input: Set of attributes in a new combination U
Input: Known partitions, S(k), k = 1, 2, ..., K
Input: Attribute flag, New b = 1 or Old, b = 0
Output: Re-assigned partitions S(k), k = 1, 2, ..., K'
Function Attribute_assignment (n, U, S(k)):
|    if b == 0 then
|    |    F = {k : k ∈
|    |    {1, ..., K}, (S(k) ∩ N (n)) ∪ (S(k) ∩ U) = ∅
|    end
|    else
|    |    F = {k : (S(k) ∩ U) = ∅, k ∈ {1, 2, ..., K}}
|    end
|    $k^* = \text{armax}_{k \in F}(2^{bit\_assigned(k)} - |S(k)|)$
|    if k* ≠ ∅ then
|    |    S(k*) = S(k*) ∪ i
|    end
|    else
|    |    if b == 0 then
|    |    |    F = {k : (S(k) ∩ N (n)) ∪ (S(k) ∩ U) = ∅, k ∈
|    |    |    {K + 1, K + 2, ..., K'}}
|    |    end
|    |    else
|    |    |    F = {k : (S(k) ∩ U) = θ, k ∈
|    |    |    {K + 1, K + 2, ..., K'}}
|    |    end
|    |    $k^* = \text{armax}_{k \in F}|S(k)|$
|    |    if k* ≠ ∅ then
|    |    |    S(k*) = S(k*) ∪ i
|    |    end
|    |    else
|    |    |    K ← K + 1
|    |    |    S(K) = i
|    |    end
|    end In an embodiment, the exemplary, incremental process above categorizes the new changes to the network into two sets: one set consists of old attributes (i.e., U(old)) that were already part of the original network and its associated conflict graph (i.e., though they are technically "new" because they are being added, some of the "new" attributes are already accounted for in the original "old" conflict graph), and another set that consists of new attributes (i.e., U(new)), where it should be noted that even though some of the newly added attributes are "old", their addition may nonetheless introduce new conflicts (e.g., new edges between attributes) in the original conflict graph. For example, in an embodiment if a system, such as a system 3a,3b, . . . 3n, determines that two or more attributes of U(old) were in the same partition previously (i.e., no conflict existed previously), then they will be separated into different partitions. Accordingly, in an embodiment a system, such as a central controller 100, may be operable to generate a new partition (group) for some of the old attributes if an existing partition that does not contain a conflicting attribute cannot be found. It should be noted that newly created partitions (i.e., {K+1, K+2, . . . K}) are expandable (no limit on bit-length) while the old or existing partitions (i.e., {1,2, . . . K}) are not expandable; their bit-lengths are fixed in order to preserve existing bit sequences and their associated labels. Therefore, if an attribute needs to be assigned to a newly created partition, there are no constraints. However, if an attribute needs to be assigned to an existing partition, we need to check if the old partition can accommodate the attribute within the given bit-length.

Because the re-assignment of old attributes from one partition (group) to another may change the referential bit sequence (label) that represents those attributes, so too may it require central controller 100, for example, to update the policy rules that are associated with such labels. Accordingly, the inventors provide for an inventive process where old attributes are processed in a separate "loop" (using separate steps) than new attributes (i.e., U(new)). This process is illustrated by the steps set forth below where each new attribute member ∈U(new) is initially assigned to an existing conflict-free partition that has a maximum amount of unused bit space. However, in some cases such an assignment is not available. Alternatively, each new attribute member ∈U(new) is assigned to a newly created partition that does not contain a conflicting attribute or attributes. Finally, if a newly created partition is not suitable (i.e., would cause a conflict), then the central controller 100, for example, may be operable to generate a new partition for this new attribute. The inventive process ensures that old attributes, that are not affected by the newly added attribute combination, can still be represented by their original referential bit sequences/labels. Here is an illustration of the inventive process just described:

---
Algorithm 4: Adding a new combination of attributes
---

Input: Set of attributes in a new combination U
Input: Set of old attributes in the new combination U(old)
Input: Set of new attributes in the new combination U(new)
Input: Known Partitions, S(k), k = 1, 2, ..., K
Output: Re-assigned partitions S(k), k = 1, 2, ..., K'
Output: New added partitions, {K + 1, K + 2, ..., K'}
for $\mu_k \in$ U(old) do
|    $k^* = \{k : \mu_i \in S(k)\}$
|    T = S(k*) ∩ {U(old) \ $\mu_i$}
|    if T ≠ ∅ then
|    |    S(k*) = S(k*) \ T
|    |    for n ∈ T do
|    |    |    S = Attribute_assignment(n, U, S, 0)
|    |    end
|    end
end
for $v_k \in$ U(new) do
|    |    S = Attribute_assignment(v_i, U, S, 1)
end Updating Policy Rules As noted previously, the re-assignment of old attributes from one partition (group) to another that changes a referential bit sequence (label)(i.e., re-numbering) that represents those attributes may require the central controller 100, for example, to update the policy rules that are associated with such labels that may be stored by the central controller and any systems or devices that make use of such rules, such as gateways 3a, 3b, . . . 3n and switches/routers 1a, 1b, . . . 1n in real-time (i.e., at the same time or substantially immediately after a new IoT device 2a,2b, . . . 2n or 4a,4b, . . . n or service/role is added or changed) without adversely impacting the operation of the network 1.

In an embodiment, an OpenFlow rule based update process may be completed where: (1) a packet that traverses through the network 1 may be processed by the old rule based on old labels or the new rule based on new labels, but not both (i.e., packet level consistency); and (2) an update may be limited to only the rules that are affected by label changes (i.e., minimal-scope updates). Based on these criteria, the OpenFlow rule based update process may use one bit in the packet header as a "version" number, and relies on wildcard-based rule matching to update policy rules.

In an embodiment, the bits that are typically a part of a Virtual Local Area Network (VLAN) field may be used as the bit that indicates the version number. Alternatively, if bits in such a field are not available, then one bit in an attribute label may be used. For example, when the central controller 100, for example, is not currently updating policy rules, it may set the version number to "0", and the version number is not matched by the rules (i.e., no policy rules need to be hanged). In an embodiment, the version number may only be meaningful during an update, at which time the new rule is assigned version number "1". It should be noted that there are two types of rules that may be affected by an update: 1) label creation rules, i.e., rules used to assign the label to packets after classifying packets at an ingress gateway; and 2) label matching rules, i.e., rules that use the label in their matching fields, which are typically policy-based packet handling rules.

Experimental Results:

The inventors conducted experiments to evaluate the inventive processes in comparison to existing approaches (e.g., compared to an existing, 1 bit per attribute approach). Experiments that included the inventive Greedy Selection process and the inventive MIS process produced an average of a 60% reduction in the bit length of a bit sequence (labels) used to encode attributes. The inventors also conducted experiments to (1) analyze the impact that adding new combination(s) of attributes would have on the bit length of a referential bit sequence by calculating the number old attributes whose labels are changed due to the addition of new combinations, and to (2) analyze the benefit of using the inventive processes for rule-space reduction. Regarding the latter, the inventors conducted simulations that included a large number of devices. As a result of their experimental simulations, the inventors discovered that the inventive processes reduced the rule-space required by several orders of magnitude (e.g., by 95%) in a single system (e.g., central controller, gateway, switch or router). As a part of their simulations, the inventors programmed an experimental system to complete the inventive processes using ®Python-based code.

Efficiency of the Inventive Processes:

In their experiments, to test the Greedy Selection process and the MIS process, the inventors controlled the following parameters: i) the total number of unique attributes $\alpha$, which represents the total number of unique services or roles existing in an experimental IoT network; ii) the total number of unique combination of attributes $\beta$, which represents the total number of unique devices in terms of attribute combinations; and iii) the average number of attributes per combination $\gamma$, which represents the average number of attributes in a single device. All three parameters may be derived from an IoT network. To compare the Greedy Selection process and the MIS process to an existing process (e.g., a baseline 1 bit per attribute approach) a bit-length metric was used. Further, the computation time for both the Greedy Selection and MIS processes were measured.

Figure 4A:
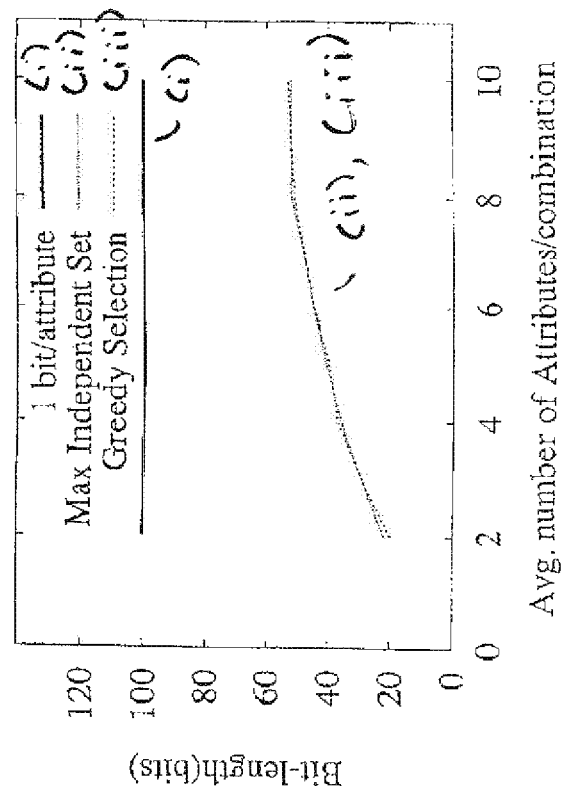
FIGS. 4A to 4C are graphs illustrating the efficiency of exemplary, inventive methodologies according to embodiments of the invention.

The inventors conducted experiments using the Greedy Selection, MIS and existing process to determine how an increase in the average number of attributes/attribute combinations might affect the number of conflicts between attributes in a conflict graph. In this experiment, the inventors used the following assumptions: given the total number of unique attributes $\alpha$ and unique combinations of attributes $\beta$, an increase in the average number of attributes/combinations might increase the number of conflicts between attributes in a conflict graph, which, in turn, might lead to an increase in the number of partitions (groups) that are needed to place attributes in a non-conflicting group that ultimately might cause an increase in the length of a referential bit sequence that represents one or more groups (partitions) of attributes. FIG. 4A graphically illustrates the results of this experiment as applied to the Greedy Selection process, MIS process and an existing process (e.g., a baseline 1 bit per attribute approach). Typically, an IoT device in an existing network may provide a maximum of 5-7 services. Therefore, in making the graphs in FIG. 4A, a maximum of 10 average attributes/combinations was used. As shown, even with such a maximum attribute/combination, the length of the bit sequences generated by the inventive Greedy Selection and MIS processes is almost half of the total number of attributes compared to an existing process (e.g., 100 services in the experimental network.

Figure 4B:
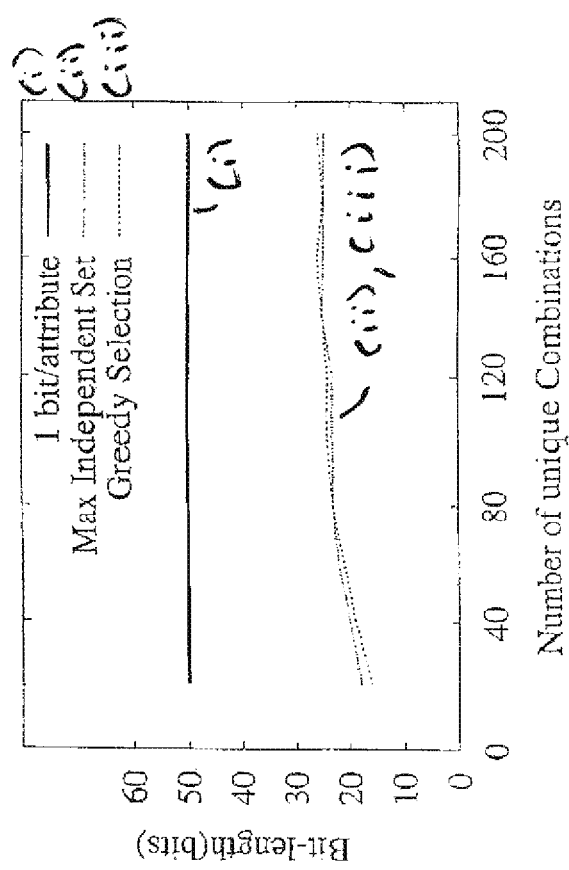

Referring now to FIG. 4B, the inventors conducted experiments using the Greedy Selection, MIS and an existing process to determine how an increase in the number of unique combinations $\beta$ would affect the length of a referential bit sequence. In this experiment, the inventors used the following assumptions: given a fixed number of total unique attributes $\alpha$ and an average number of attributes per combination $\gamma$, an increase in the number of unique combinations $\beta$ might lead to an increase in the length of a referential bit sequence. However, the results of this experiment demonstrated that the length of a referential bit sequence does not increase as fast as in the experiments illustrated in FIG. 4A because an increase in an average number of attributes per combination (FIG. 4A) affects all attribute combinations and, therefore, has a multiplying effect, while an increase in number of combinations (FIG. 4B) has a linear effect.

Figure 4C:
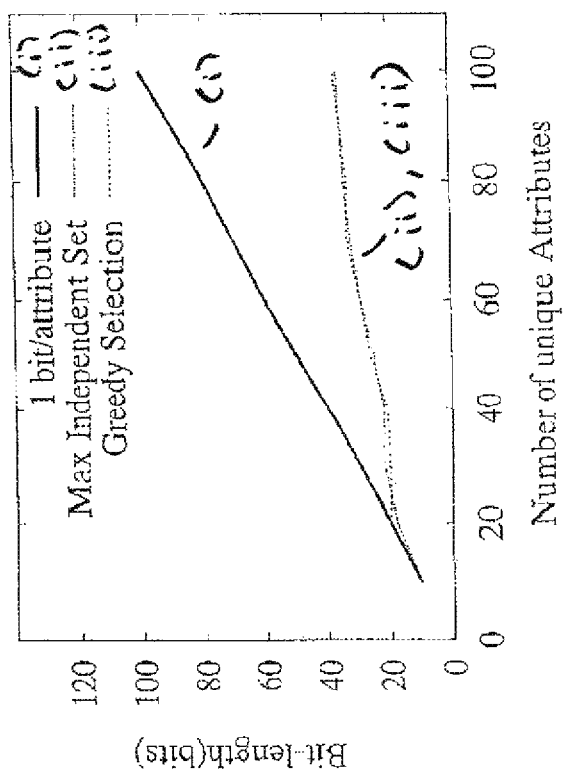

Referring now to FIG. 4C, the inventors conducted experiments using the Greedy Selection, MIS and existing process to determine the effect that an increase in the number of unique attributes ($\alpha$) has on the incremental length of a referential bit sequence. As shown, this experiments revealed that the length of a bit sequence generated by the existing process increased linearly while, by comparison, the length of the referential bit sequence generated by the Greedy Selection and MIS processes increased substantially slower as given by the graph in FIG. 4C. As a result, the inventors concluded that the inventive processes permit the encoding (labeling) of a large number of attributes using shorter referential bit sequences and a smaller number of referential bit sequences overall as compared to the existing process. For example, in one embodiment, an experiment revealed that for a maximum of 100 unique attributes, the inventive processes may require a referential bit sequence whose bit length is 40 or less (i.e., 40 bits or less), which can easily fit into the space allocated to the address filed in an IP core protocol (e.g. MAC address field).

Figure 5:
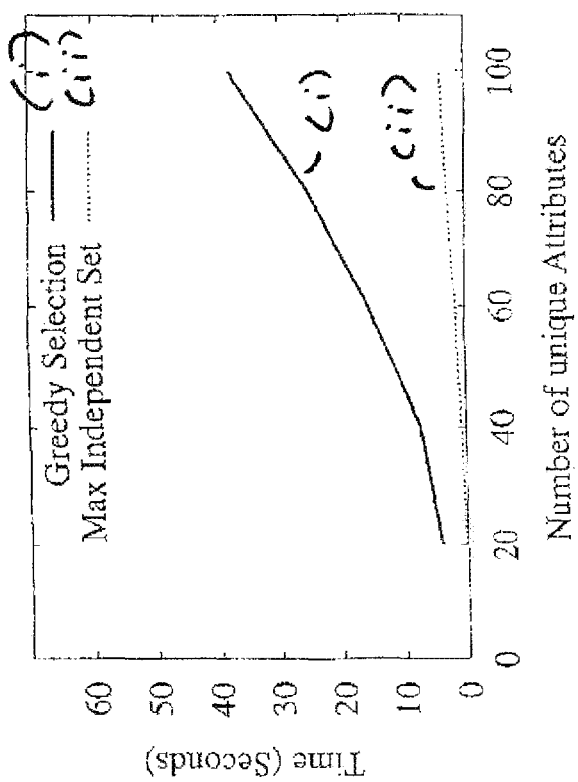
FIG. 5 depicts a graph illustrating the computation times for two exemplary, inventive methodologies according to embodiments of the invention.

It should be noted that in the graphs set forth in FIGS. 4A to 4C, both the Greedy Selection and MIS processes provided similar experimental results in terms of bit-length. However, in terms of computational time the inventors discovered that the MIS process appears to outperform the Greedy Selection process. For example, FIG. 5 graphically illustrates experimental computation times for the inventive MIS and Greedy Selection processes. As shown, the computation time of the Greedy Selection process grows exponentially with an increase in the number of services, while the computation time of the MIS process remains almost constant. It should be noted that in generating the graphs in FIG. 5 fixed values for both the average number of attributes/combination and the number of unique combinations were used.

Figure 6:
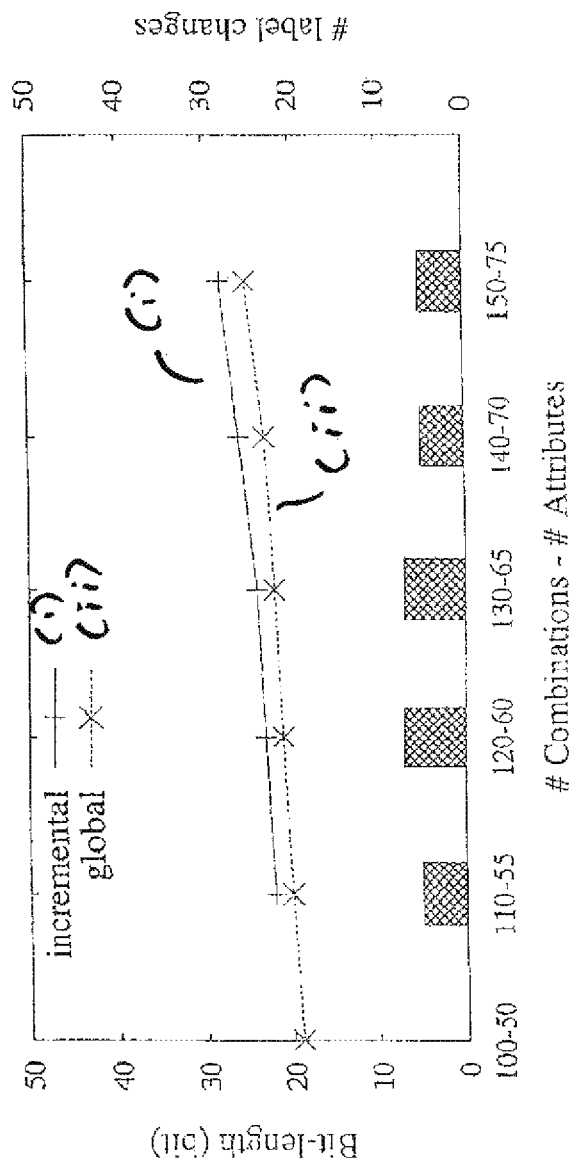
FIG. 6 is a graph illustrating the effect on the length of exemplary bit sequences provided by exemplary, inventive methodologies due to changes in an IoT network.

Experiments Involving the Addition of New Attribute Combinations:

Referring now to FIG. 6, there is graphically depicted the affect that the addition of new attribute combinations and attributes to an experimental IoT network (one batch at a time) have on the number of label changes (i.e., number of old attributes relocated to different partitions) and the length of a referential bit sequence. To begin, this experiment made use of 100 combinations and 50 attributes (hence the nomenclature "100-50" shown in FIG. 6). Thereafter, 10 more attribute combinations that contained 5 more attributes in total were added to the experimental IoT network. In FIG. 6, the bar charts depict the number of label (bit sequence) changes that resulted each time attribute combinations were added and the process for adding a new combination of attributes described previously above was invoked (the values are shown on the right y-axis).

FIG. 6 also depicts two curves. One curve (called "incremental") depicts an "incremental" increase in a corresponding, total length of a bit sequence when the process for adding a new combination of attributes described previously above is invoked. In comparison, the second curve (called "global") depicts the length of a bit sequence when a Greedy Selection process is applied directly on the entire set of attribute combinations and attributes. The left y-axis shows the results.

As a result of analyzing the graphs in FIG. 6, the inventors discovered that the process used to generate the "incremental" graph required 1 to 3 more bits than the process used to generate the "global" graph. For example, referring to the bar graph that indicates the addition of 120 unique attribute combinations and 60 unique attributes, the process associated with the "global" graph required 22 bits to create a bit sequence (label), In comparison, when 10 new combinations and 5 new attributes were added to an existing network that includes 110 combinations and 55 attributes and the process used to generate the "incremental" graph was used, 24 bits were required—2 more bits than the process used to generate the "global" graph. The inventors also discovered that that the number of label changes (changes to a referential bit sequence) were below 10% when new attribute combinations and new attributes were added to the experimental network and algorithm 4 was applied (i.e., executed by a simulated, experimental system).

Rule Reduction:

The inventors also conducted experiments to calculate the number rules that may be produced by the inventive processes.

More particularly, the inventors simulated an IoT network with a large number of devices with various services and roles (e.g., 15 unique services, number of roles). For a particular service based access control policy, the inventors calculated the number of rules that were needed for both inventive processes in comparison with an existing process (e.g., a unique device ID addressing scheme). It should be noted that in the experimental, simulated IoT network, the inventors assumed that all of the rules may be installed on a single system (e.g., central controller 100, gateway 3a,3b, . . . 3n, switch, router, 1a, 1b, . . . 1n, etc.).

In one experiment, the inventors evaluated the rule reduction capability of the inventive processes as the number of devices in the network increased. In another experiment, the inventors evaluated the effect that an increase in the number of service or role-based access control policies had on the rule reduction capability of the inventive processes. In both experiments, for simplification, the inventors assumed each service provider device had one service, and each client device could only send one request message at a time. To accommodate multiple request messages, an existing device ID based scheme requires complicated packet parsing. Accordingly, there exists no standard parsing process that handles multiple request messages as a baseline for comparison. Therefore, a multi-service scenario was not considered in this set of experiments.

Accordingly, in their experiments the inventors defined a new rule-ratio metric, where such a ratio is defined as the number of rules used by an existing, device ID based addressing scheme (as a numerator in the ratio) over the number of rules used by the inventive, labeling based methodologies.

The inventors conducted experiments using the Greedy Selection, MIS and existing process to determine what effect that an increase in the number of host devices in IoT network would have on the rule-ratio metric.

Figure 7A:
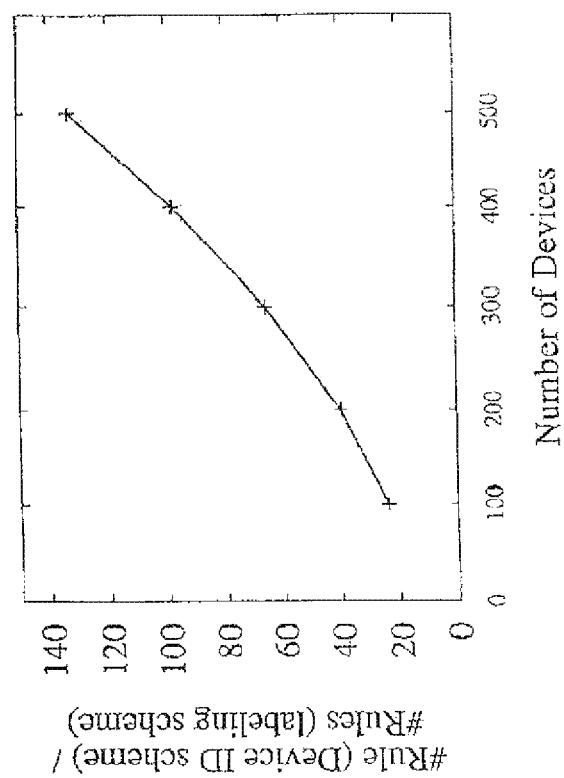
FIGS. 7A and 7B depict graphs illustrating the effects on policy rules provided by exemplary, inventive methodologies.

The results of the experiments using a network similar to network 1 depicted in FIG. 1 are graphically depicted in FIG. 7A. In FIG. 7A (as well as FIG. 7B), the vertical axis contains a ratio where the numerator "# Rule (Device ID Scheme)" is an existing technique and the denominator "# Rule(labeling scheme)" is an inventive technique.

The inventors discovered that an increase in the number of IoT devices in their experimental IoT network resulted in an increase in the number of rules given by the product (multiplication of) of the number of devices and when an existing methodology was used. For example, in the exemplary simulated network utilized by the inventors, the rule-ratio is tentatively equal to $(m \times n)/(m+n+b)$, where m, n are the number client and service provider devices, and b is a constant that is proportional to the number of policies. Note that b is much smaller compared to m+n. As illustrated in FIG. 7A, as the number of client and service provider devices increases, (m×n) grows much faster compare to (m+n+b).

On the other hand, when an inventive methodology was used the increase in the number of rules increases additively (i.e., much slower)—as opposed to multiplicatively—with respect to the number of IoT devices. It should be noted that, when new devices were added into the experimental network, no new services or service combinations were added.

The inventors also conducted experiments using the Greedy Selection, MIS and existing process to determine, given a fixed number of devices (100 devices), the affect on the rule-ratio when the number of attribute-based access control policies in the network were increased.

Figure 7B:
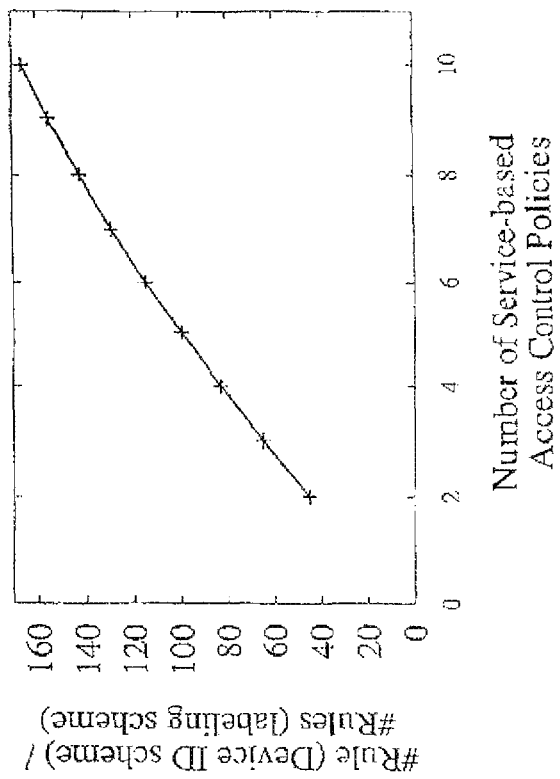

As graphically depicted in FIG. 7B, the results indicate that, given a fixed number of devices (e.g., 100 devices), the value of the rule-ratio increases when the number of attribute-based access control policies in the network increases.

However, when the results depicted in FIG. 7A were compared to the results in FIG. 7B, the inventors discovered that the rule-ratio increased at a slower rate because the increase in the number of attribute-based access control policies actually increased the total number of rules needed to be provided by the inventive processes.

It should be understood that the policy rule reduction experiments conducted by the inventors involved a simplified, experimental IoT network that simulated the operation of a single system (gateway, switch router) that stored all policy rules. The inventors recognize that, in a more complex scenario where the rules may be distributed across multiple gateways and switches in a network, the number of rules used by the inventive processes may depend on how the rules are distributed. In general, the inventors expect that more rules may be required as compared to the single-system scenario. Nonetheless, even if more rules are required, because the number of systems (gateways, switches, routers) are typically far less than the number of IoT devices, the inventive processes will still provide a significant savings compared to existing methodologies.

To briefly summarize our discussion concerning the generation of the bit sequences, we can say the following. First, the generation of the inventive, exemplary conflict graphs discussed herein allows for the application of two heuristic processes to optimize the generation of the inventive labels due to the fact that these graphs are configured such that each IoT device attribute appears as a node in the graph, and "edges" between nodes are generated if there exists a conflict between attributes (i.e., attributes appear in the same device). Second, the inventive processes generate groups (or partitions) of non-conflicting attributes, ensuring that conflicting attributes are designated for inclusion in separate groups. This process allows for the efficient generation of bit sequences (binary encoding) to represent the do generated groups of attributes. Third, the inventive process of incrementally adding new attributes does not necessarily require reformulation or re-generation of a conflict graph. Instead, the inventive process incrementally assigns each new attribute to a group which does not include a conflicting attribute, or, alternatively generates a new group to which the attribute is assigned. Last, but not least, the inventive incremental process allows for the incremental updating of renumbered labels, which in turn, allows for the updating of policy rules in switches/routers, gateways, etc., on-the-fly, in real-time without substantial interruption of the operation of a network.

Taken together, these features can be said to provide systems, devices and related methods that generate source and destination attribute labels. where each label comprises one or more bit sequences derived from minimizing a number of groups of non-conflicting attributes (i.e., the efficient generation of bit sequences in groups of conflicting attributes) that correspond to a plurality of IoT devices in an IoT network.

It should be understood that the foregoing description only describes a few of the many possible embodiments that fall within the scope of the inventions. Numerous changes and modifications to the embodiments disclosed herein may be made without departing from the general spirit of the invention, the scope of which is best defined by the claims that follow.

What we claim are:

1. A gateway device, comprising a processor and memory, for encoding an Internet-of-Things (IoT) packet, the device operable to:
   detect information related to an IoT source device and information related to an IoT destination device in the IoT packet, wherein the IoT source and destination devices are in an IoT network;
   generate a source attribute label based on the detected information of the IoT source device; and
   generate a destination attribute label based on the detected information of the IoT destination device,
   wherein the generated source and destination attribute labels each comprise one or more bit sequences derived from minimizing a number of groups of non-conflicting attributes.

2. The device as in claim 1 wherein the IoT source device comprises a client device and the IoT destination device comprises a service provider device.

3. The device as in claim 2 wherein the generated source attribute label comprises role attributes of the IoT source device and the generated destination attribute label comprises service attributes of the IoT destination device.

4. The device as in claim 1 wherein the IoT source device comprises a service provider device and the IoT destination device comprises a client device.

5. The device as in claim 4 wherein the generated source attribute label comprises service attributes of the IoT source device and the generated destination attribute label comprises role attributes of the IoT destination device.

6. The device as in claim 1 further operable to generate an encoded packet by inserting the generated source and destination attribute labels into fields that correspond to source and destination address fields.

7. The device as in claim 6, wherein the system is further operable to insert the source attribute label and the destination attribute label into pre-determined positions in the address fields.

8. The device as in claim 6, wherein the system is further operable to insert the source attribute label and the destination attribute label into randomly selected positions in the address fields.

9. The device as in claim 1 further operable to generate an encoded packet by inserting the generated source and destination attribute labels into fields that correspond to source and destination address fields of a core Internet Protocol.

10. The device as in claim 9 wherein the source and destination address fields comprise IPv4 or IPv6 fields.

11. A gateway device, comprising a processor and memory, for decoding an encoded Internet-of-Things (IoT) packet, the device operable to:
   receive the encoded IoT packet, and detect a source attribute label within a source address field of the IoT packet and a destination attribute label within a destination address field of the IoT packet, wherein the source and destination attribute labels each comprise one or more bit sequences derived from minimizing a number of groups of non-conflicting attributes that correspond to a plurality of IoT devices in the IoT network.

12. The device as in claim 11, wherein the system is further operable to:

compare the source attribute label to a plurality of stored, reference bit sequences to determine attributes that correspond to an IoT source device, and compare the destination attribute label to the plurality of stored, reference bit sequences to determine attributes that correspond to an IoT destination device.

13. The device as in claim 12, wherein the system is further operable to generate a decoded packet that comprises the determined attributes of the IoT source and destination devices.

14. An Internet-of-Things (IoT) device, the device operable to receive a decoded IoT message comprising source and destination attributes, the attributes derived from decoded source and destination attribute labels that are based on minimizing a number of groups of non-conflicting attributes that correspond to a plurality of IoT devices, including the IoT device, in an IoT network.

15. A device for transporting an encoded Internet-of-Things (IoT) message, the device operable to:
   receive an encoded packet, the encoded packet comprising encoded source and destination attribute labels that are based on minimizing a number of groups of non-conflicting attributes that correspond to a plurality of IoT devices, in an IoT network;
   compare the encoded attribute labels to one or more stored digital masks to determine if the attribute labels correspond to one or more stored rules; and
   complete one or more actions or functions that correspond to the rules if the comparison indicates that the attribute labels correspond to one or more stored rules.

16. The device as in claim 15 wherein the device comprises a hardware switch or hardware router.

17. A control device, comprising a processor and memory, for generating referential bit sequences for a network of Internet of Things (IoT) devices, the device operable to:
   generate the referential bit sequences based on minimizing a number of groups of non-conflicting attributes that correspond to a plurality of IoT devices, in an IoT network;
   store the generated bit sequences; and
   forward the so generated sequences to one or more additional devices responsible for transporting IoT messages.

* * * * *